United States Patent
Froese et al.

(10) Patent No.: US 9,294,551 B1
(45) Date of Patent: Mar. 22, 2016

(54) COLLECTIVE ENGINE METHOD AND APPARATUS

(71) Applicant: Cray Inc., Seattle, WA (US)

(72) Inventors: Edwin L. Froese, Burnaby (CA);
Robert Baird, Merritt Island, FL (US);
Steven L. Scott, Eau Claire, WI (US)

(73) Assignee: Cray Inc., Seattle, WA (US)

( * ) Notice: Subject to any disclaimer, the term of this patent is extended or adjusted under 35 U.S.C. 154(b) by 379 days.

(21) Appl. No.: 13/798,082

(22) Filed: Mar. 13, 2013

Related U.S. Application Data

(60) Provisional application No. 61/724,891, filed on Nov. 9, 2012, provisional application No. 61/724,887, filed on Nov. 9, 2012.

(51) Int. Cl.
*G06F 15/16* (2006.01)
*H04L 29/08* (2006.01)
*H04L 12/715* (2013.01)
*H04L 12/751* (2013.01)
*H04L 12/26* (2006.01)

(52) U.S. Cl.
CPC ............ *H04L 67/10* (2013.01); *H04L 12/2602* (2013.01); *H04L 43/02* (2013.01); *H04L 45/02* (2013.01); *H04L 45/04* (2013.01)

(58) Field of Classification Search
CPC ... G06F 15/17337; H04L 45/02; H04L 45/04; H04L 12/2602; H04L 43/02
See application file for complete search history.

(56) References Cited

U.S. PATENT DOCUMENTS

| | | | |
|---|---|---|---|
| 6,016,510 A | 1/2000 | Quattromani et al. | |
| 6,857,004 B1 | 2/2005 | Howard et al. | |
| 7,219,178 B2 | 5/2007 | Harris et al. | |
| 7,443,869 B2 | 10/2008 | Solomon et al. | |
| 7,650,434 B2 | 1/2010 | Blumrich et al. | |
| 7,958,182 B2 | 6/2011 | Arimilli et al. | |
| 7,958,183 B2 | 6/2011 | Arimilli et al. | |
| 2004/0078493 A1* | 4/2004 | Blumrich et al. ............. | 709/250 |
| 2005/0097300 A1 | 5/2005 | Gildea et al. | |
| 2010/0049836 A1 | 2/2010 | Kramer | |
| 2011/0113083 A1 | 5/2011 | Shahar | |

OTHER PUBLICATIONS

Chen, Dong, et al., "The IBM Blue Gene/Q Interconnection Network and Message Unit", "SC11", Nov. 12-18, 2011, pp. 1-10.

(Continued)

*Primary Examiner* — Chirag R Patel
(74) *Attorney, Agent, or Firm* — Charles A. Lemaire; Jonathan M. Rixen; Lemaire Patent Law Firm, P.L.L.C.

(57) ABSTRACT

A data-processing system and method for performing collective operations. Some embodiments provide a plurality of leaf software processes, a plurality of collective engines (CEs), and a network operatively coupled to the plurality of CEs, wherein collective operations messages are sent between CEs. Each of the plurality of hierarchies includes a root, leaf CEs, and one or more intermediate levels of CEs between the root and the leaf CEs. Each CE except the root is configured to have a parent CE, and each non-leaf CE in the hierarchy that is not the root CE and not one of the leaf CEs has one or more child CEs. Data is sent from software processes to one or more of the plurality of CEs, and data is received to one or more software processes from one or more of the plurality of collective engines. The root CE outputs a final result.

27 Claims, 9 Drawing Sheets

(56) References Cited

OTHER PUBLICATIONS

Almasi, George, et al., "Optimization of MPI Collective Communication on BlueGene/L Systems", "ICS '05 Proceedings of the 19th annual international conference on Supercomputing", Jun. 20-22, 2005, pp. 253-262.

Mellanox Technologies, "Core-Direct—The Most Advanced Technology for MPI/SHMEM Collectives Offoads", "downloaded from: http://www.mellanox.com/pdf/whitepapers/TB_CORE-Direct.pdf", May 2010.

Mellanox Technologies, "Fabric Collective Accelerator (FCA)", "download from web-address: http://www.mellanox.com/related-docs/prod_acceleration_software/FCA.pdf", 2011.

Shainer, Gilad, et al., "Accelerating High Performance Computing Applications Through MPI Offloading", "HPC Advisory Council", 2011, Publisher: downloaded from: http://www.hpcadvisorycouncil.com/pdf/WP_Accelerating_HPC_%20Apps_through_MPI_Offloading.pdf.

* cited by examiner

CE DOORBELL-MESSAGE BLOCK DIAGRAM

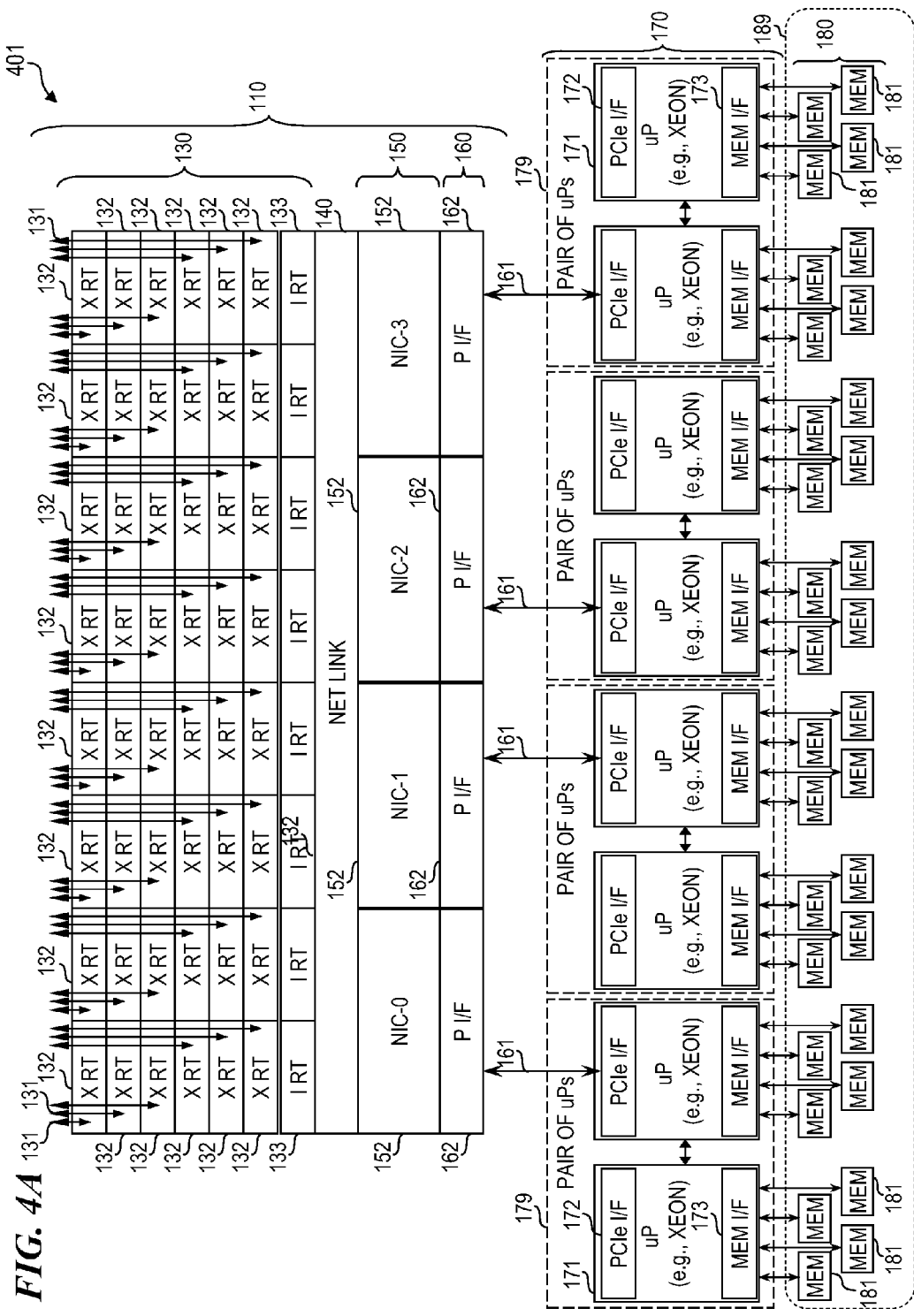

COLLECTIVE ENGINE METHOD AND APPARATUS

CROSS-REFERENCE TO RELATED APPLICATION

This application claims priority benefit, under 35 U.S.C. §119(e), of U.S. Provisional Patent Application No. 61/724,891 filed Nov. 9, 2012 by Edwin Froese et al., titled "Collective engine method and apparatus," and U.S. Provisional Patent Application No. 61/724,887 filed Nov. 9, 2012 by Edwin Froese et al., titled "Method and apparatus for deadlock avoidance," each of which is incorporated herein by reference in its entirety.

FIELD OF THE INVENTION

The invention relates generally to computer software and/or hardware, and more particularly to methods and apparatus performing collective operations in a multiprocessor environment.

BACKGROUND OF THE INVENTION

A massively parallel processor (MPP) is one type of supercomputer. An MPP consists of a large number of independent computing nodes (processors and memory) interconnected with a specialized high-speed network. The number of nodes in a supercomputer can be in the thousands. An application or task running on an MPP is divided into many subtasks, each of which executes on its own node. The subtasks execute in parallel, each subtask computing a portion of the final result. These individually computed results in general need to be combined multiple times during the execution of the overall application, with the combined intermediate result being sent back to each of the nodes running the subtasks of the application.

Frequently, the nodes participating in an application running on an MPP are organized into one or more logical-tree structures. In what may be conceived of as an inverted-tree structure, the subtasks of the application run on the leaves of the tree (the lowest level of the tree). Reduction operations are performed when partial or final results need to be combined, that is, data are sent up the tree from the leaves to intermediate tree nodes, where the data from several individual leaf nodes are combined. Each of the intermediate results is sent up to the next level of the tree, where again several pieces of data are combined. This process continues until the root of the tree is reached and a single reduction result is computed. The reduction result can then be sent back down the tree (a scatter operation) to all of the participating nodes. The combinatorial operations performed at each level of the tree may be arithmetic (sum, min/max) or logical (AND, OR, XOR) (together referred to as the specified arithmetic-logical reduction operations). The scatter operation can also be used as a broadcast to send data from a root node to all of the leaves. Together, reduction operations and scatter operations are known as "collective operations."

In some applications, the overall performance of the application can be limited by the time to move data over the network between nodes, and by the time to perform the reduction operations. Therefore, application performance can be improved by providing in some embodiments a network designed to more efficiently move data between the nodes of a tree. Further performance improvements can result from providing hardware to perform the collective operations as the data moves up and down the tree, rather than performing the collective operations in software.

There remains a need in the art for an improved engine and method for performing collective operations in a multiprocessor.

BRIEF SUMMARY OF THE INVENTION

In some embodiments, a massively parallel processor (MPP) consists of a plurality of nodes, interconnected with a high-speed network. One embodiment of such a high-speed network includes a plurality of routers (optionally including an appropriate mix of software and integrated-circuit (IC) chip(s)) interconnected with one another as nodes in a router-connected network, wherein each node is connected to one or more microprocessors each having shared or distributed memory. A network is constructed by interconnecting a plurality of routers. In some embodiments, a router includes a plurality (e.g., in some embodiments, four) network interface functions (NIFs). Each NIF connects a node (that includes one or more processors and their local memory or memories) to the network. In some embodiments, the network provides any-to-any connectivity between nodes. Applications running on the MPP are divided into subtasks, which run on a plurality of the nodes. The subtasks that comprise the applications communicate with each other over the network. In some embodiments, the communication between subtasks includes collective operations on data generated or calculated by the subtasks on the plurality of nodes. In some embodiments, the functions of the present invention are implemented entirely or to a large extent in software, with certain performance assists optionally being provided by additional hardware circuitry. The overall configuration and functionality is controlled and set up by software, and the results are returned to the software, whether or not one or more particular subportions are implemented entirely by software or are implemented partially or entirely with hardware assists.

The present invention includes a "collective engine" (CE), which provides the ability to perform rapid reductions of small quantities of data across potentially many software processes (or tasks) running at many network nodes (known as endpoints in some embodiments). In some embodiments, each CE instance supports a small number of virtual CEs. To facilitate scaling, software configures virtual connections among a plurality of virtual CEs such that the virtual CEs are arranged in an inverted-tree structure. The software processes join a reduction by issuing requests to the virtual CEs at the "bottom" of the tree (i.e., at the leaves). The partial-reduction results propagate in a direction, termed as "upward," toward the root of the tree. In some embodiments, the final reduction result then propagates back down the tree and is delivered to the participating processes by the virtual CEs at the bottom of the tree. In some embodiments, each CE supports common logical, integer, and floating-point operations on 32-bit and 64-bit operands.

In some embodiments, the tree structure is completely logical. That is, software can configure any virtual CE to be the child (at the next-lower level in the tree) of any other virtual CE. In some embodiments, there are no limitations on the logical-tree structure due to the actual physical connections between nodes as provided by the router-connected network.

In some embodiments, a collective engine provides an arithmetic and logic unit to perform data reductions (arithmetic or logical operations) across a collective of many software processes. A collective is formed in a tree structure with the software processes as leaves of the tree and CEs as nodes in the tree. Each parent node (a parent node being a node with children) performs a reduction of the operands sent to it from its children. This tree structure is defined by software configuring each participating virtual collective engine, specifying the children it is expected to support, and if it is not the root, who its parent is. In some embodiments, there is one physical collective engine per network-interface circuit (NIC), each collective engine having four (4) virtual collective engines, and each virtual collective engine capable of supporting up to 32 children. Each child is either a software process or lower-level parent (a CE). The top of the tree is defined (configured) as the root. Each virtual collective engine performs a reduction of the operands passed to it from its children. When it has completed its part of the reduction, the result is forwarded up to the next-higher parent or root. In some embodiments, when the virtual collective engine defined as the root completes its part of the reduction, it starts passing the result back down the tree using a scatter operation. When a lower-level parent receives the scatter request, it continues the scatter process by passing the results to its children. This continues until all the children have received the result.

BRIEF DESCRIPTION OF THE DRAWINGS

FIG. 4A is a block diagram of a network subsystem 401 having a router-to-PCIe circuit 110 and a plurality of processors, each processor having a plurality of memory subsystems, according to some embodiments of the invention.

DETAILED DESCRIPTION OF THE INVENTION

Although the following detailed description contains many specifics for the purpose of illustration, a person of ordinary skill in the art will appreciate that many variations and alterations to the following details are within the scope of the invention. Very narrow and specific examples are used to illustrate particular embodiments; however, the invention described in the claims is not intended to be limited to only these examples, but rather includes the full scope of the attached claims. Accordingly, the following preferred embodiments of the invention are set forth without any loss of generality to, and without imposing limitations upon the claimed invention. Further, in the following detailed description of the preferred embodiments, reference is made to the accompanying drawings that form a part hereof, and in which are shown by way of illustration specific embodiments in which the invention may be practiced. It is understood that other embodiments may be utilized and structural changes may be made without departing from the scope of the present invention.

The leading digit(s) of reference numbers appearing in the Figures generally corresponds to the Figure number in which that component is first introduced, such that the same reference number is used throughout to refer to an identical component which appears in multiple Figures. Signals and connections may be referred to by the same reference number or label, and the actual meaning will be clear from its use in the context of the description.

Figure 1A:
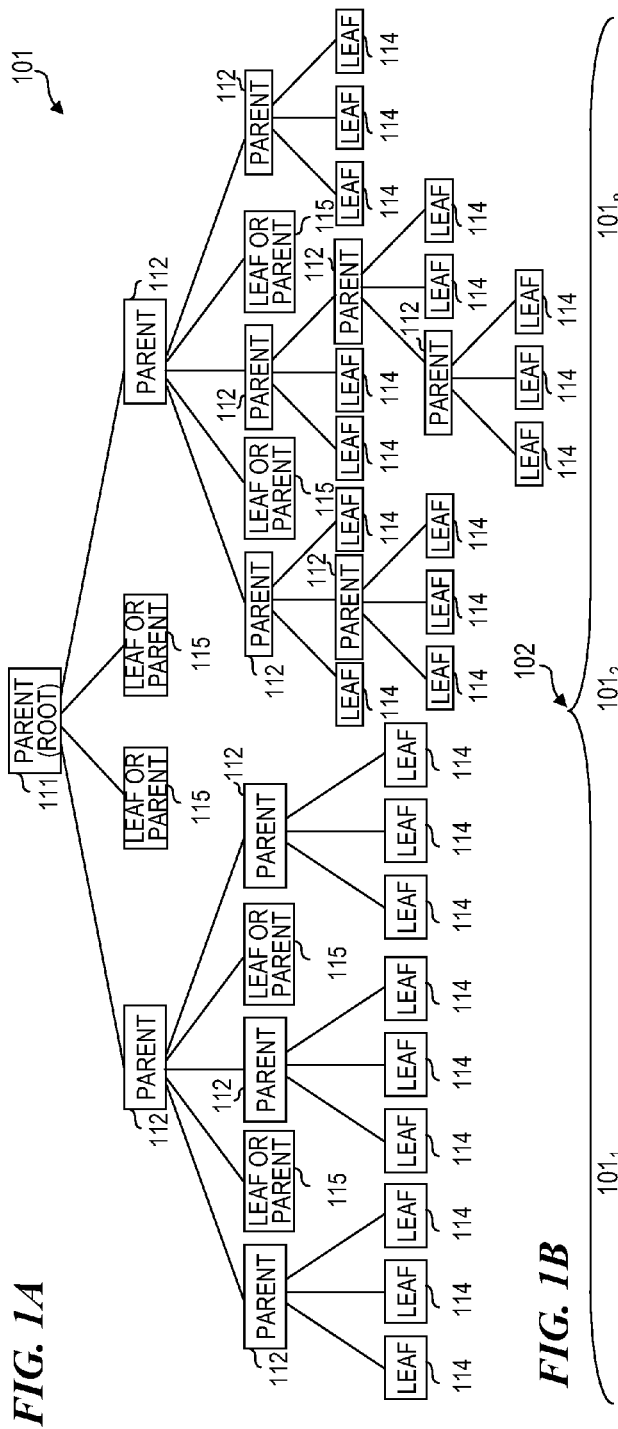
FIG. 1A is a block diagram of a virtual collective tree 101, according to some embodiments of the invention.

FIG. 1A is a block diagram of a software-configured virtual collective tree 101 (sometimes alternatively called a collection tree 101), according to some embodiments of the invention. In some embodiments, software-configured virtual collective tree 101 includes a root node 111 (e.g., the top row of FIG. 1A, having a single node), which is the ultimate parent node, a plurality of other parent nodes 112, some of which are configured as children of root 111 (e.g., the second row of nodes of FIG. 1A, in this example having four nodes, two of which are indicated as parent nodes 112 and the other two of which are indicated as leaf-or-parent nodes 115 (these could be leaf elements directly connected to the root 111, or the parents of other nodes not shown here)). Similarly, the third row of nodes of FIG. 1A, in this example having ten nodes, five of which are indicated as children of the left-most parent node 112 of the second row (three of the five are indicated as parent nodes 112 and the other two of which are indicated as leaf or parent nodes 115), and the other five nodes of the third row are indicated as children of the right-most parent node 112 of the second row. The left-most nine nodes of the fourth row are all indicated as leaf elements 114, and are children of the indicated three parents of the third row. On the right side of FIG. 1A, a plurality of additional rows of nodes is shown, wherein the final children are indicated as leaf elements 114. As can be seen, the software-configured virtual collective tree 101 can be configured as symmetrical or asymmetrical, according to the needs of the software.

Figure 1B:
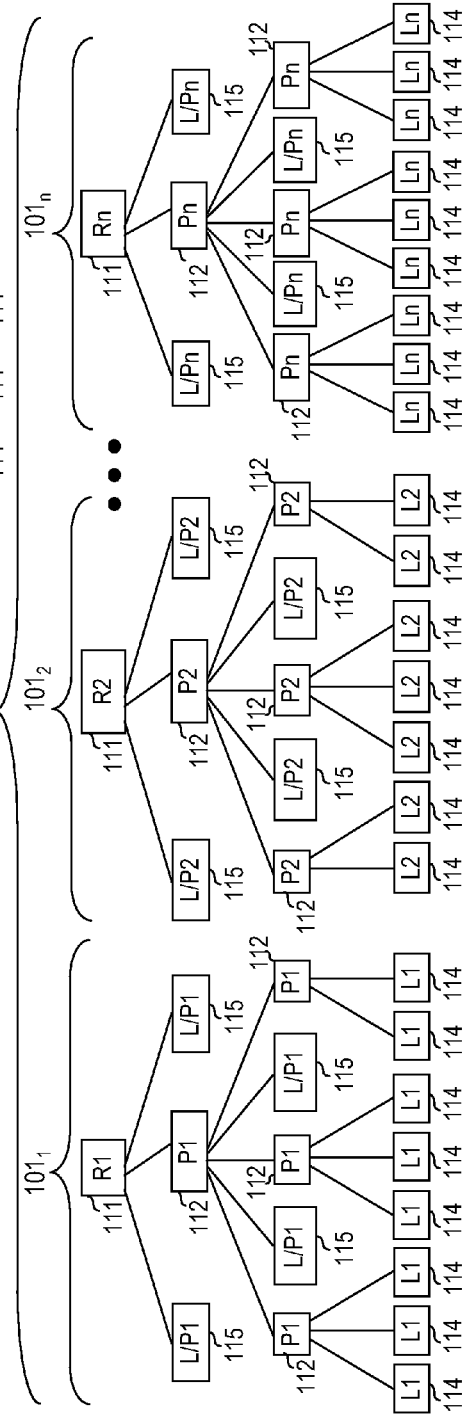
FIG. 1B is a block diagram of a plurality 102 of software-configured virtual collective trees ($101_1$, $101_2$, ... $101_n$) according to some embodiments of the invention.

FIG. 1B is a block diagram of a plurality 102 of software-configured virtual collective trees ($101_1$, $101_2$, ... $101_n$) according to some embodiments of the invention. In some embodiments, software of the system can asynchronously create, use, and then remove various ones of the plurality 102 of software-configured virtual collective trees, such that at various times, a single software-configured virtual collective tree $101_1$ may be the only software-configured virtual collective tree that is configured and active, or as software, at later times, generates and uses additional software-configured virtual collective trees 101, a large plurality of software-configured virtual collective trees 101 will be active simultaneously. Then as various of the software-configured virtual collective trees 101 are later removed or added by software, the facilities in use (not available for creating additional trees) and the facilities not in use (available for creating additional trees) change, so fixed hardware trees for collective-engine functions are undesirable.

Figure 1C:
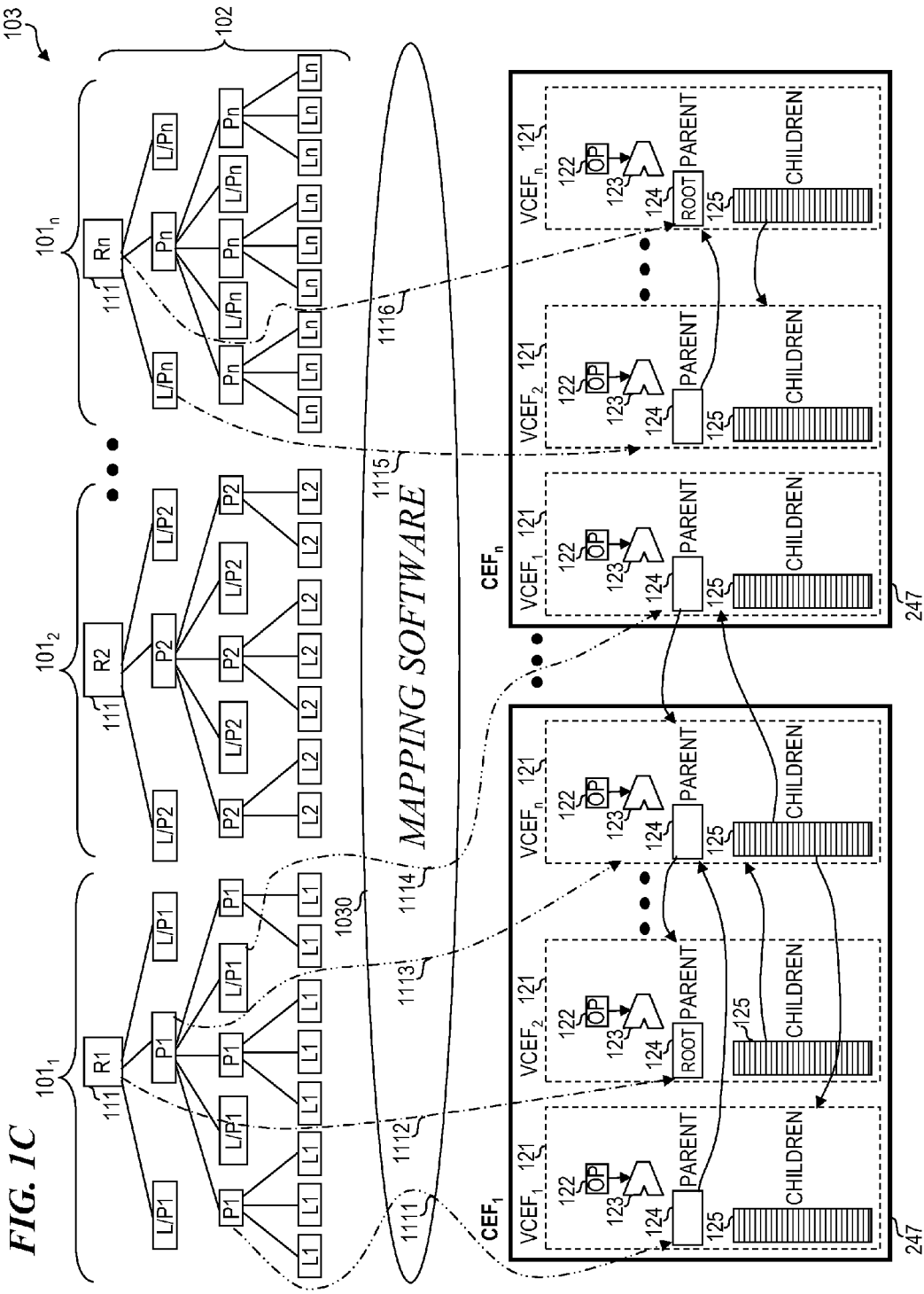
FIG. 1C is a block diagram of a collective system 103 that maps a plurality 102 of software-configured virtual collective trees ($101_1$, $101_2$, ... $101_n$) onto a plurality of collective-engine functions 247, according to some embodiments of the invention.

FIG. 1C is a block diagram of a collective system 103 that maps a plurality 102 of software-configured virtual collective trees ($101_1, 101_2, \ldots 101_n$) onto a plurality of collective-engine functions ($CEF_1 \ldots CEF_n$) 247, according to some embodiments of the invention. For clarity of explanation, only a small subset of the mapping is shown here. In some embodiments, a plurality of collective-engine functions ($CEF_1 \ldots CEF_n$) each implements a plurality of virtual collective-engine functions 121 (e.g., $VCEF_1, VCEF_2 \ldots VCEF_n$), wherein each VCEF 121 can be configured to any node (i.e., root, parent, or leaf) in any collective tree (e.g., $101_1, 101_2, \ldots 101_n$). Thus, the software has the flexibility to create new virtual collective trees 101 using, for example, in some embodiments, mapping software 1030, which will map software-configured virtual collective tree $101_1$ such that $VCEF_2$ of $CEF_1$ is configured (via mapping 1112, which, in some embodiments, loads suitable values in data structures used by the collective-engine function) as the root R1 of virtual collective tree $101_1$ (in this figure, R1 is the root of tree $101_1$, P1s indicate parent nodes of tree $101_1$ other than the root, and L1s indicate the leaf elements of tree $101_1$) wherein the parent pointer 124 of $VCEF_2$ of $CEF_1$ indicates (e.g., by using a predetermined value, e.g., zero, that is not used as a pointer value, or some other suitable indication) this node is the root, and the children pointers 125 are configured to point to the children nodes of root R1 (here, one of the children pointers 125 of $VCEF_2$ of $CEF_1$ indicates that $VCEF_n$ of $CEF_1$ is one of its children, and the parent pointer 124 of $VCEF_1$ of $CEF_1$ indicates that $VCEF_n$ of $CEF_1$ is its parent). In like manner, mapping 1111 loads values into the data structure(s) used by $CEF_1$ 247 ... $CEF_n$ 247 to indicate that the parent of $VCEF_1$ of $CEF_1$ is $VCEF_2$ of $CEF_1$ (e.g., the parent pointer 124 of $VCEF_n$ of $CEF_1$ points to $VCEF_n$ of $CEF_1$, and one of the children pointers 125 of $VCEF_n$ of $CEF_1$ (the lower of the two pointers shown in FIG. 1C) points to $VCEF_1$ of $CEF_1$). In like manner, mapping 1113 loads values into the data structure(s) used by $CEF_1$ 247 ... $CEF_n$ 247 to indicate that the parent of $VCEF_n$ of $CEF_1$ is $VCEF_2$ of $CEF_1$ (i.e., the parent pointer 124 of $VCEF_n$ of $CEF_1$ points to $VCEF_2$ of $CEF_1$, and one of the children pointers 125 of $VCEF_2$ of $CEF_1$ points to $VCEF_n$ of $CEF_1$). The mapping software 1030 can also map a single tree 101 to VCEFs 121 that are in a plurality of different CEFs 247; accordingly, mapping 1114 loads values into the data structure(s) used by $CEF_1$ 247 ... $CEF_n$ 247 to indicate that the parent of $VCEF_1$ of $CEF_n$ is $VCEF_n$ of $CEF_1$ (i.e., the parent pointer 124 of $VCEF_1$ of $CEF_n$ points to $VCEF_n$ of $CEF_1$, and one of the children pointers 125 of $VCEF_n$ of $CEF_1$ (the upper of the two pointers shown in FIG. 1C) points to $VCEF_1$ of $CEF_n$). Similarly, mapping 1115 loads values into the structure(s) used by $VCEF_2$ of $CEF_n$, and mapping 1116 loads values into the structure(s) used by $VCEF_n$ of $CEF_n$. In some embodiments, when a child software process joins a tree 101 at a leaf node, the mapping software 1030 loads the specification of the arithmetic operation (that is to be used in the collective reduction function) into data structure 122 (sometimes called OP, representing the specification of the operation to be performed) that controls the arithmetic-logical unit 123 of the particular VCEF 121 for that node. (In some embodiments, the arithmetic-logical unit 123, or ALU 123, sometimes called a reduction unit 123, can optionally include support for other reduction functions, such as barrier synchronization, or the like.) In some embodiments, as each node completes the collective reduction function on the data for all of its children, that node passes both the resulting data and the specification of the arithmetic operation to its respective parent, which later checks to verify that the specification of the arithmetic operation in that node and the specifications of the arithmetic operation received from each of its children match each other, and, in some embodiments, the node reports an error if there is a mismatch.

Figure 2:
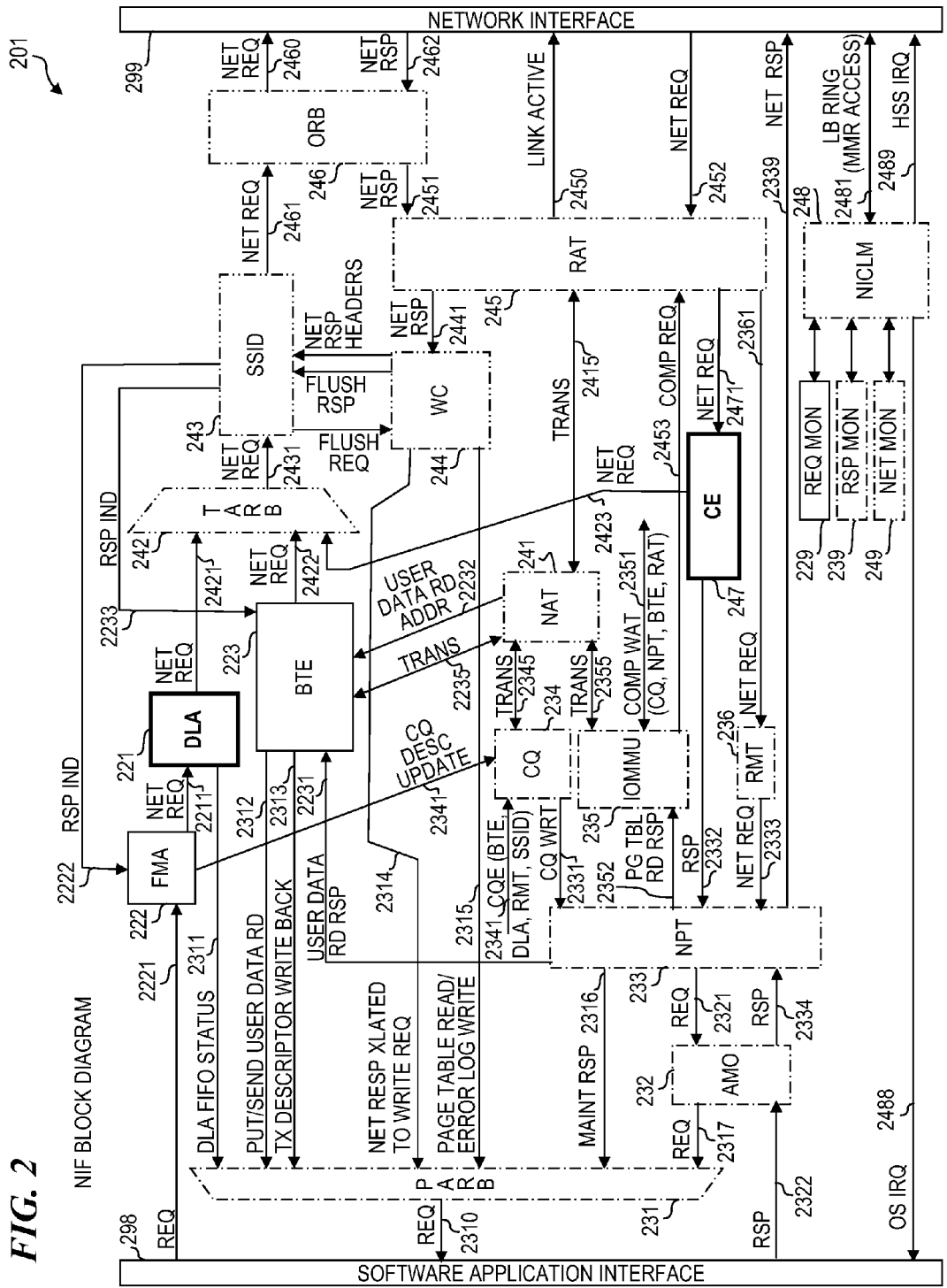
FIG. 2 is a block diagram of a network-interface function (NIF) 201 having a collective engine (CE) function 247 and a deadlock-avoidance (DLA) function 221, according to some embodiments of the invention.

FIG. 2 is a block diagram of a network-interface function (NIF) 201 (in some embodiments, some or all of this is implemented in hardware, and so is also sometimes referred to as a network-interface circuit (NIC) 201 in some embodiments, a network-interface core (NIC) in other embodiments, or as a network-interface card (NIC) in yet other embodiments). The network-interface circuit (NIC) 201 has a collective-engine (CE) function 247 and a deadlock-avoidance (DLA) function 221, according to some embodiments of the invention. In some embodiments, NIF 201 includes fast-memory-access (FMA) function 222 that receives, as input, signal REQ 2221 sent from the software application interface 298 of the processor connected to the node (the left side of FIG. 2), and signal RSP IND 2222; FMA function 222 outputs signal NET REQ 2211 sent to DLA function 221, and outputs signal CQ DESC UPDATE 2341 sent to function CQ 234.

The following additional abbreviations appear in the present description: AMO (atomic memory operation); BTE (block-transfer engine); CEDM (collective-engine doorbell-message); CEF (collective-engine function); COMP WAT (completion wait); CQ (completion queue); DLA (deadlock avoidance); FIFO (first-in-first-out buffer); HSS (hardware supervisory system); IND (indication); IOMMU (input-output memory-management unit); IRQ (interrupt request); LB (logical block); MAINT (maintenance); MMR (memory-mapped registers); MON (monitor); NAT (network-address translation); NET (network); NICLM (network-interface core-logic monitor); NPT (non-posted table); ORB (outstanding-request buffer); OS (operating system); PARB (processor-interface arbiter); PCI (personal computer interface); PG (page); RAT (remote-address translation); RD (read); REQ (request); RMT (receive-message table); RSP (response); SSID (synchronization-sequence identification); TARB (transmit arbiter); TBL (table); TRANS (translate); TX (transmit); WC (write combining); WRT (write).

In some embodiments, DLA function 221 receives, as input, signal NET REQ 2211; DLA function 221 outputs signal NET REQ 2421 sent to TARB function 242, and outputs signal DLA FIFO STATUS 2311 sent to function PARB 231. In some embodiments, TARB function 242 receives, as input, signal NET REQ 2421 from DLA 221, signal NET REQ 2422 from BTE 223 and signal NET REQ 2423 from CE 247; TARB function 242 outputs signal NET REQ 2431 sent to SSID function 243.

In some embodiments, SSID function 243 receives, as input, signal NET REQ 2431 from TARB function 242, and generates signals NET REQ 2461 sent to ORB 246 and RSP IND 2233 sent to BTE 223; SSID function 243 also generates as output signal FLUSH REQ and in return receives, as input, signal FLUSH RSP from WC 244 and signal NET RSP HEADERS from WC 244.

In some embodiments, BTE function 223 receives as input signals RSP IND 2233 from SSID 243, USER DATA RD RSP 2231 from NPT 233 and USER DATA RD ADDR 2232 from NAT 241, and generates as output signals NET REQ 2422 sent to TARB 242, PUT/SEND USER DATA RD 2312 sent to PARB 231 and TX DESCRIPTOR WRITE BACK 2313 sent to PARB 231. BTE 223 also communicates, as input and output, signal TRANS 2235 to and from NAT 241.

In some embodiments, ORB function 246 receives, as input, signal NET REQ 2461 from SSID function 243, and generates output signal NET REQ 2460; ORB function 246 then receives, as input, signal NET RSP 2462 and generates as output signal NET RSP 2451 sent to RAT function 245.

In some embodiments, RAT function 245 receives, as input, signal NET RSP 2451 from ORB function 246, and generates output signal NET RSP 2441 sent to WC 244; RAT function 245 also receives, as input, signal NET REQ 2452 and generates, as outputs, signal NET REQ 2471 sent to CE function 247 and signal NET REQ 2361 sent to RMT function 236; RAT function 245 also communicates, as input and output, signal TRANS 2415 to NAT 241, receives as input, signal COMP REQ 2453 and generates as output signal LINK ACTIVE 2450.

In some embodiments, WC function 244 receives, as input, signal NET RSP 2441 from RAT function 245, and generates output signal NET RESP XLATED TO WRITE REQ 2314 to PARB function 231 and output signal PAGE TABLE READ/ERROR LOG WRITE 2315 also sent to PARB function 231; WC function 244 receives (from SSID function 243) as input signal FLUSH REQ and in return sends, as output, signal FLUSH RSP and signal NET RSP HEADERS to SSID function 243.

In some embodiments, NAT function 241 communicates, as input and output, signal TRANS 2415 to RAT function 245; communicates, as input and output, signal TRANS 2345 to CQ function 234; communicates, as input and output, signal TRANS 2355 to IOMMU function 235; communicates, as input and output, signal TRANS 2235 to BTE function 223; and generates as output, signal USER DATA RD ADDR 2232 sent to BTE 223.

In some embodiments, CQ function 234 communicates, as input and output, signal TRANS 2345 to NAT function 241; receives, as input, signal CQE (BTE, DLA, RMT, SSID) 2341 and generates as output CQ WRT 2331 sent to NPT 233.

In some embodiments, IOMMU function 235 receives, as input, signal COMP WAT (CQ, NPT, BTE, RAT) 2351; receives, as input, signal PG TBL RD RSP 2352; communicates, as input and output, signal TRANS 2355 to NAT function 241; and generates, as output, COMP REQ 2453 sent to RAT 245.

In some embodiments, CE function 247 receives, as input, signal NET REQ 2471 from RAT 245; generates, as output, signal NET REQ 2423 sent to TARB function 242; and generates as output, signal RSP 2332 sent to NPT 233.

In some embodiments, RMT function 236 receives, as input, signal NET REQ 2361 from RAT 245; and generates as output, signal NET REQ 2333 sent to NPT 233.

In some embodiments, NPT function 233 receives, as input, signal CQ WRT 2331 from CQ function 234; receives, as input, signal RSP 2332 from CE function 247; receives, as input, signal NET REQ 2333 from RMT function 236; receives, as input, signal RSP 2334 from AMO function 232. NPT function 233 also generates as output, signal USER DATA RD RSP 2231 sent to BTE 223, generates as output, signal REQ 2321 sent to AMO 232, generates as output, signal NET RSP 2339 sent to Network Interface 299, and generates as output, signal MAINT RSP 2316 sent to PARB 231.

In some embodiments, PARB function 231 receives, as input, signal DLA FIFO STATUS 2311 from DLA function 221; receives, as input, signal PUT/SEND USER DATA RD 2312 from BTE function 223; receives, as input, signal TX DESCRIPTOR WRITE BACK 2313 from BTE function 223; receives, as input, signal NET RESP XLATED TO WRITE REQ 2314 from WC function 244; receives, as input, signal PAGE TABLE READ/ERROR LOG WRITE 2315 from WC function 244; receives, as input, signal MAINT RSP 2316 from NPT function 233; and receives, as input, signal REQ 2317 from AMO function 232. PARB function 231 also generates as output, signal REQ 2310 sent to the software application interface 298 of the processor connected to the node.

In some embodiments, AMO function 232 receives, as input, signal REQ 2321 from NPT 233; then generates as output, signal REQ 2317 sent to PARB 231; AMO function 232 also receives, as input, signal RSP 2322 sent from the software application interface 298 of the processor connected to the node, then generates as output, signal RSP 2317 sent to NPT 233.

In some embodiments, NICLM function 248 communicates with REQ MON function 229; communicates with RSP MON function 239; communicates with NET MON function 249; communicates signal LB RING (MMR ACCESS) 2481 with the network interface 299 on the network side (to the right-hand side of the FIG. 2); generates as output signal HSS IRQ 2489 sent to the network interface 299, and generates as output signal OS IRQ 2488 sent to the network interface 299.

Figure 3:
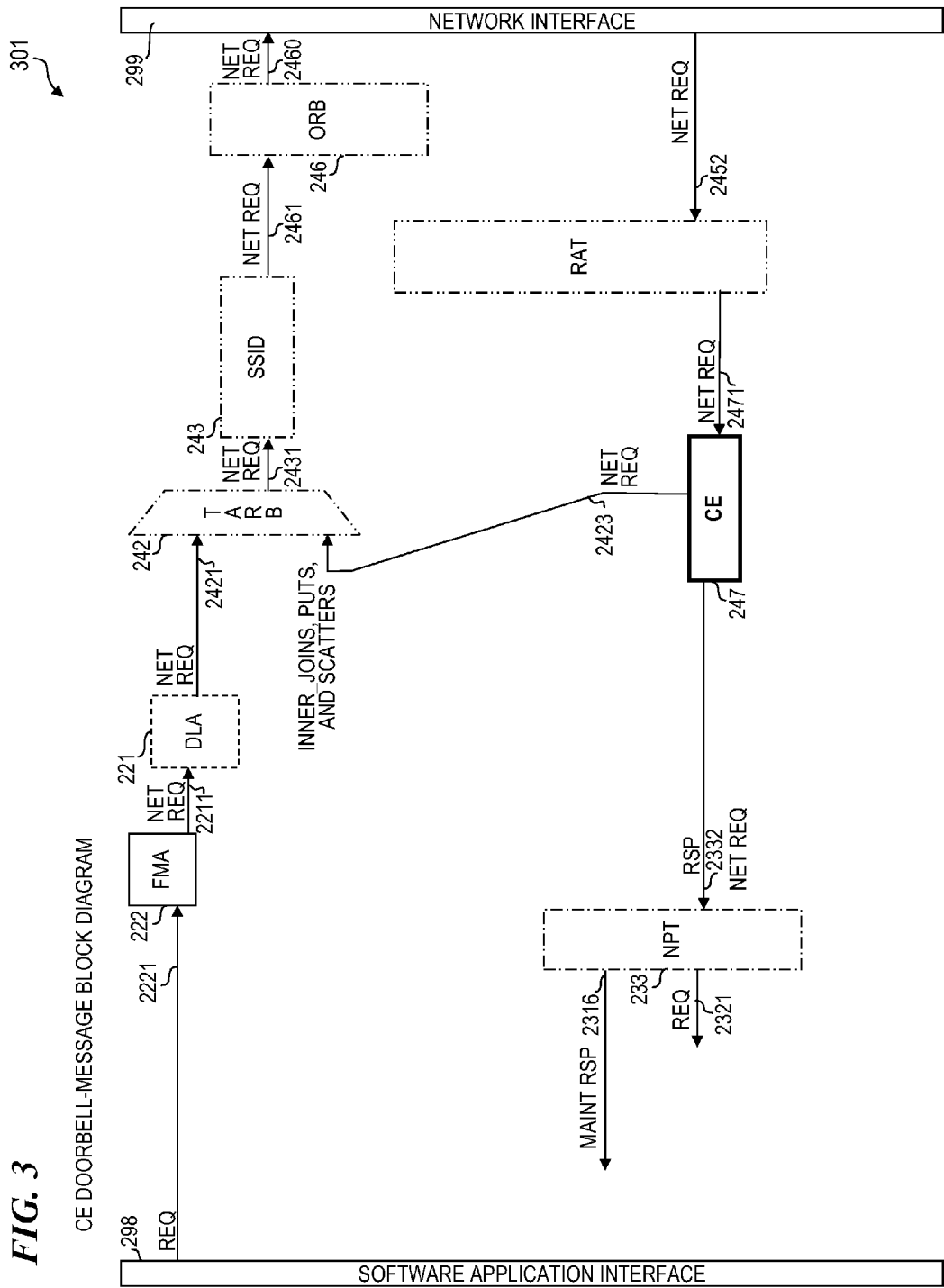
FIG. 3 is a block diagram of a collective-engine doorbell-message (CEDM) function 301 having a collective-engine (CE) function 247 and a deadlock-avoidance (DLA) function 221, according to some embodiments of the invention.

FIG. 3 is a simplified block diagram of a collective-engine doorbell-message (CEDM) function 301 having a collective-engine (CE) function 247 and a deadlock-avoidance (DLA) function 221, according to some embodiments of the invention. The features of FIG. 3 are described above in the more detailed diagram and description of FIG. 3. The NET REQ 2423 provides inner join operations, put operations and scatter operations.

FIG. 4A is a block diagram of a network subsystem 401 having a router-to-PCIe function 110 and a plurality of processors, each processor having a plurality of memory subsystems, according to some embodiments of the invention. In some embodiments, router-to-PCIe function 110 is implemented in software. In some embodiments, each network subsystem 401 includes a plurality of network nodes (in the example shown in FIG. 4A, four nodes are provided), each node including its own network-interface function 152 (NIF, in some embodiments, implemented such as 201 shown in FIG. 2) (in the example shown in FIG. 4A, each NIF is implemented as a network-interface circuit (NIC) labeled NIC-0, NIC-1, NIC-2 and NIC-3, while in other embodiments, the NIFs 152 are implemented largely or substantially entirely in software that runs the network interface 299 (see FIG. 2 and FIG. 3) for its network node). In some embodiments, each network node can be programmed to be a leaf node 114, parent node 112, or root node 111 of a collective tree 101 implemented on network 101 (see FIG. 1A). In some embodiments, router-to-PCIe function 110 is implemented in hardware as a single integrated-circuit chip. In some embodiments, router-to-PCIe function 110 includes a plurality 130 of functional router tiles including a plurality of external router tiles (XRT) 132 (e.g., in some embodiments, forty XRTs 132 are used), a plurality of internal router tiles (IRTs) 133 (e.g., in some embodiments, eight IRTs 133 are used), wherein each XRT 132 includes one or more data transmission lanes (in some embodiments, each XRT includes three lanes) that provide extremely high data-transfer bandwidth (e.g., in some embodiments, providing 14-Gbps signaling (about 5.25 GB/s/direction). In some embodiments, the plurality of IRTs 133 couple through a Netlink interface 140 to a plurality 150 of network-interface circuits (NICs) 152 (in some embodiments, four NICs are used for the network-interface function (NIF) 201 shown in FIG. 2 and are labeled NIC-0 152, NIC-1 152, NIC-2 152 and NIC-3 152). In some embodiments, each NIC 152 connects to a processor interface (P I/F) 162, such that the number of the plurality 150 of NICs equals the number of the plurality 160 of P I/Fs. In some embodiments, each P I/F 162 couples to its own PCIe bus 161, the other end of which is connected to a PCIe interface (PCIe I/F) 172 of one of a plurality 170 of processors 171. In some embodiments, the processors 171 are connected in pairs 179 of processors, wherein one of the two processors 171 in each pair 179 is connected to one of the plurality of PCIe busses 161, and the other processor 171 of that pair 179 is not. In some embodiments, a plurality 180 of memory subsystems 181 is provided. The networked multiprocessor system as a whole (in some embodiments, built using a plurality of network subsystems 401 connected to one another using physical connections 131) can be considered to have a memory 189 (i.e., the memory considered as a whole) that includes the plurality 180 of memory subsystems 181 of every one of the plurality of network nodes. In some embodiments, each processor 171 includes a memory interface (MEM I/F) 173 that, in some embodiments, connects to a plurality 180 of memory subsystems 181 (in some embodiments, each processor 171 connects directly to four memory subsystems 181 that are accessible through that respective processor 171. In some embodiments, each subsystem 101 is coupled to a plurality of other similar or identical network subsystems 401 (not shown here) using physical connections 131, each of which connects to one of the plurality of XRTs 132. Definitions of the various units and functions identified by the reference numbers in FIG. 2, FIG. 3, and FIG. 4A are provided below.

Figure 4B:
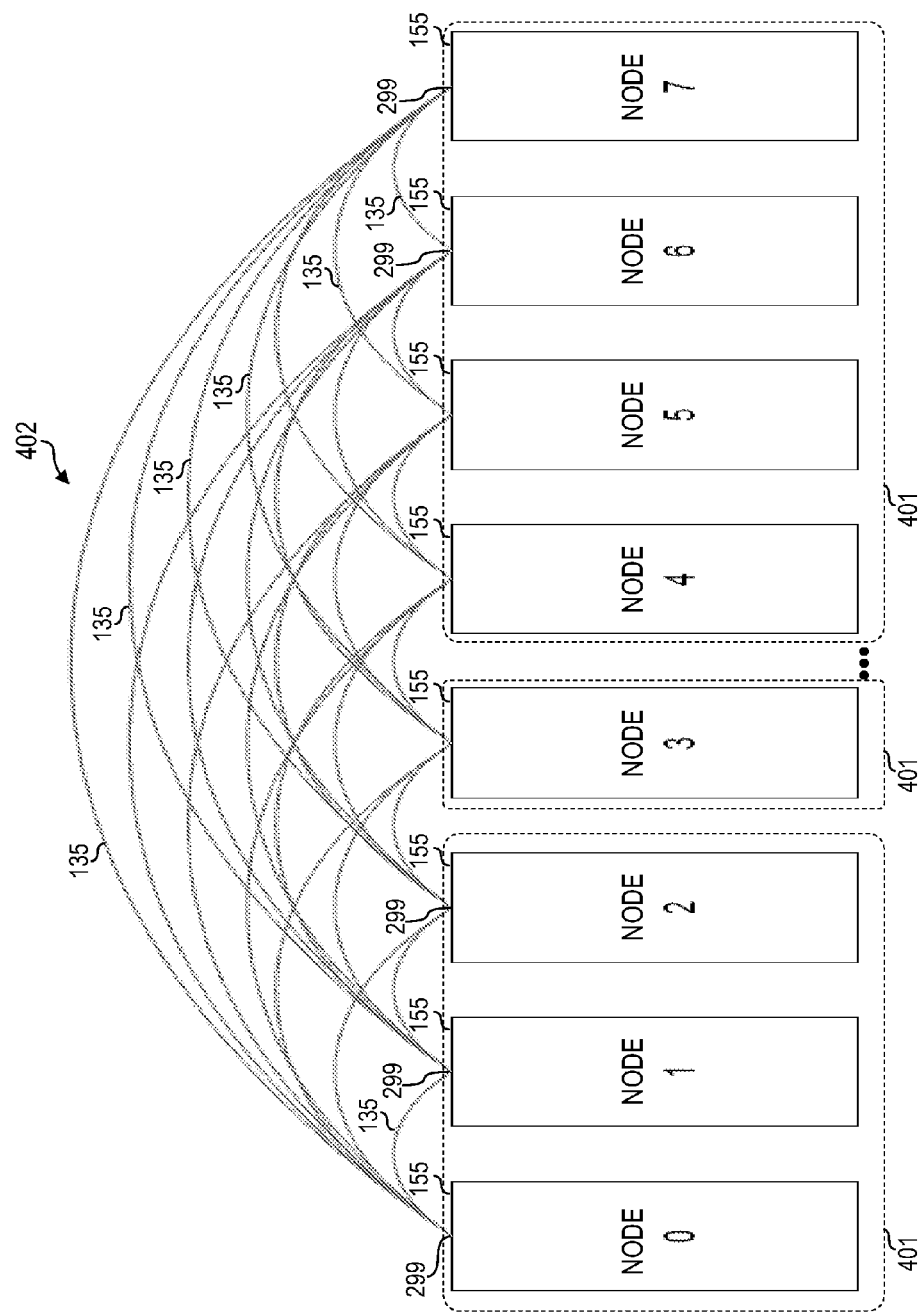
FIG. 4B is a block diagram of a networked system 402 having a plurality of network nodes each interconnected to all of the other network nodes by network connections 135, according to some embodiments of the invention.

FIG. 4B is a block diagram of a networked multiprocessor system 402 having a plurality of network nodes 155, wherein each of the plurality of network nodes 155 is interconnected to a plurality of the other network nodes 155 by network connections 135 (for example, in some embodiments, using physical connections 131—see FIG. 4A), according to some embodiments of the invention. In some embodiments, networked multiprocessor system 402 is implemented using a plurality of network subsystems 401 interconnected to one another either directly using physical connections 131 (one-to-one connections, for example, such as shown in FIG. 4A), or indirectly through other network subsystems 401 using a sequence of physical connections 131 and the other network subsystems 401, wherein each of the plurality of network subsystems 401 implements a plurality of network nodes 155. Note that in some embodiments, the interconnections between NIFs 150 (which can be used to implement nodes 155) can be implemented as intraconnections within a network subsystem 401. In some such embodiments, the network connections 135 between network nodes 155 are implemented using connections 131 (as shown in FIG. 4A) that connect between the network interface function 152 of one network node 155 and the network interface functions 152 of the other network nodes 155. In some embodiments, each network node 155 includes one or more processors 171 and one or more memory subsystems 181 (see FIG. 4A).

Figure 5:
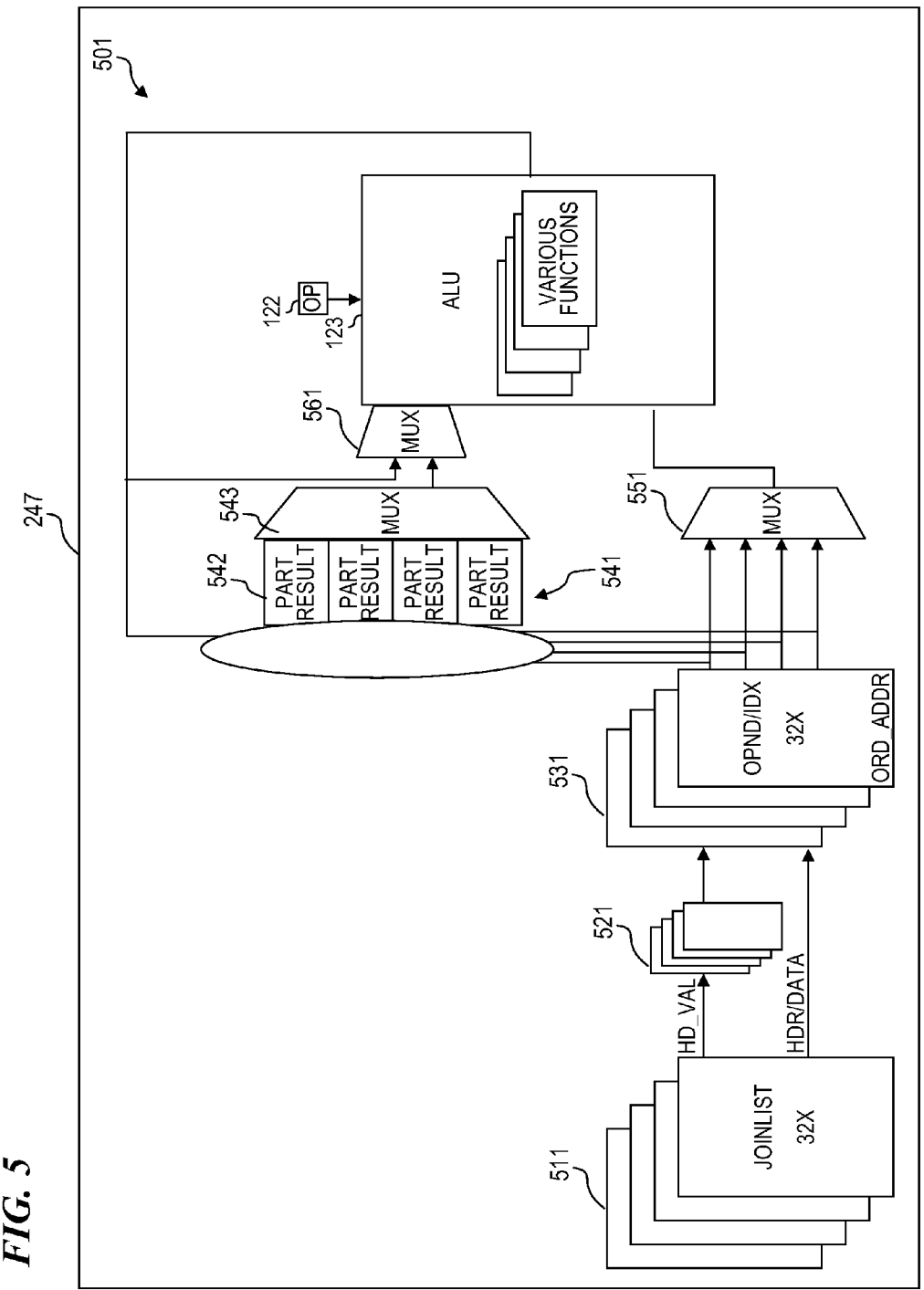
FIG. 5 is a block diagram of a collective-engine function (CEF) 247 that supports a plurality of virtual collective-engine functions (VCEFs) 121, according to some embodiments of the present invention.

FIG. 5 is a block diagram of a collective-engine function (CEF) 247 that supports a plurality of virtual collective-engine functions (VCEFs) 121, according to some embodiments of the present invention. In some embodiments, CEF 247 includes a data structure 501 that includes a plurality of joinlists 511 (e.g., in some embodiments, four joinlists 511 are provided, one for each of four VCEFs 121 (see FIG. 1C described above), wherein each joinlist 511 supports a plurality of child nodes (e.g., in some embodiments, 32 children per joinlist)). In some embodiments, each joinlist 511 includes the data 521 needed to verify incoming operands and node addresses from all the children of the node. The first operand and index that are received for each VCEF 121 are saved in partial-result latches 541. In some embodiments, multiplexor (mux) 543 is used to select a specific partial result 542 to be sent to the ALU 123. Subsequent new operands/indices from locations 531, along with the partial results 542 are sent to the ALU 123, with the result data accumulated in partial-result latches 542. In some embodiments, a bypass multiplexor (mux) 561 can route partial results more directly into ALU 123 if additional data is available immediately from mux 551 that receives operands from operand/index locations 531 (which receive and provide the parameters from the children (in some embodiments, up to 32 children's operands/indexes per VCEF 121). In some embodiments, the joinlist 511 contains selected information from the join and configuration data to form the scatter or PUT requests at reduction conclusion.

In some embodiments, each virtual CE is configured by a data structure (e.g., in some embodiments, stored in memory-mapped registers (MMR)) accessed via the local block. If defined as a root, the end of its reduction phase initiates a scatter operation using the saved join list data to send the appropriate command to its children. If not defined as the root, it waits for receipt of a scatter command with the result data to initiate its scatter operation to either lower level parents or software processes. After receipt of the result the software process can initiate a join to the same collective for a different reduction (using the same ALU operation, or a different one). A collective reduction is only completed when all the expected members have successfully joined the collective. In some embodiments, how many children and who the children are defined by loading the configuration MMRs. As joins are received, the headers and collective control word (CCW) are checked, some detected errors will cause the join to be rejected with an error response sent to the non-posted table (NPT) and the virtual CE left waiting for all the members to join. If the reduction does complete even though errors were detected or floating point exceptions were encountered, status information is reported in the CCW of the data packet and sent with the inner-join, scatter, or PUT. See FIG. 6 "Collective Payload Flit 1" for the CCW layout used for some embodiments. Like the block-transfer-engine (BTE) operations, a synchronization-sequence ID (SSID) value is automatically assigned on the first request on that virtual channel. The end of the sequence is signaled by sending a SyncComplete after an inner-join or after all the scatters/PUTs have completed. Although the CE supports both 32- and 64-bit operations, in some embodiments, it does not support packed mode for 32-bit operations. It expects to see 64-bit wide operands or indexes, although when in 32-bit mode the MSB ([64:32]) end of the result is zero, as only [31:0] has the appropriate result. For min/max operations, although the operand result is [31:0], the index value is the complete 64-bit index supplied. Thus, in some embodiments, data flit output looks like the data structure 601 of FIG. 6.

Figure 6:
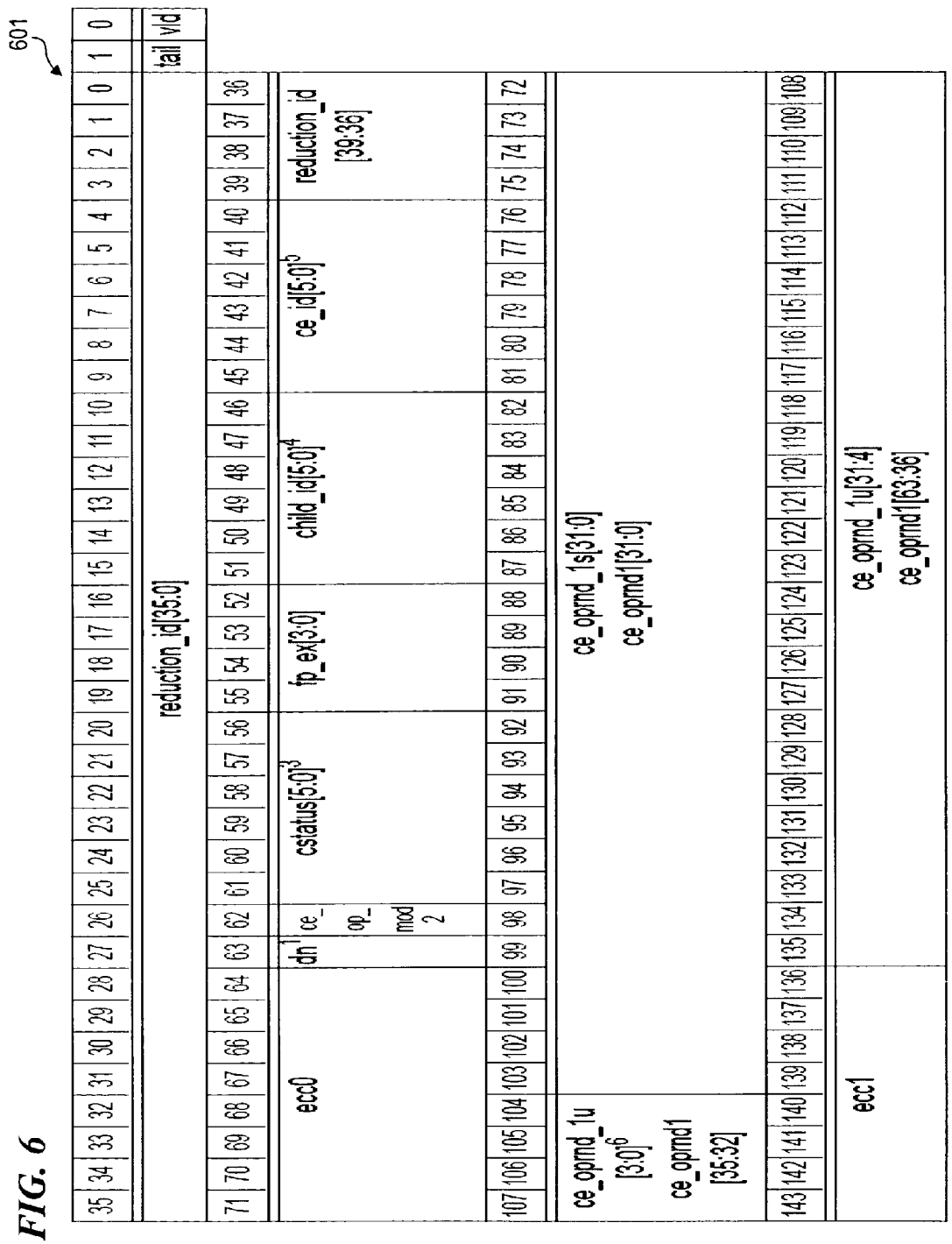
FIG. 6 is a diagram of a data structure 601 of flit data for a collective operation, according to some embodiments of the present invention.

FIG. 6 is a diagram of a data structure 601 of flit data for a collective operation, according to some embodiments of the present invention.

Figure 7:
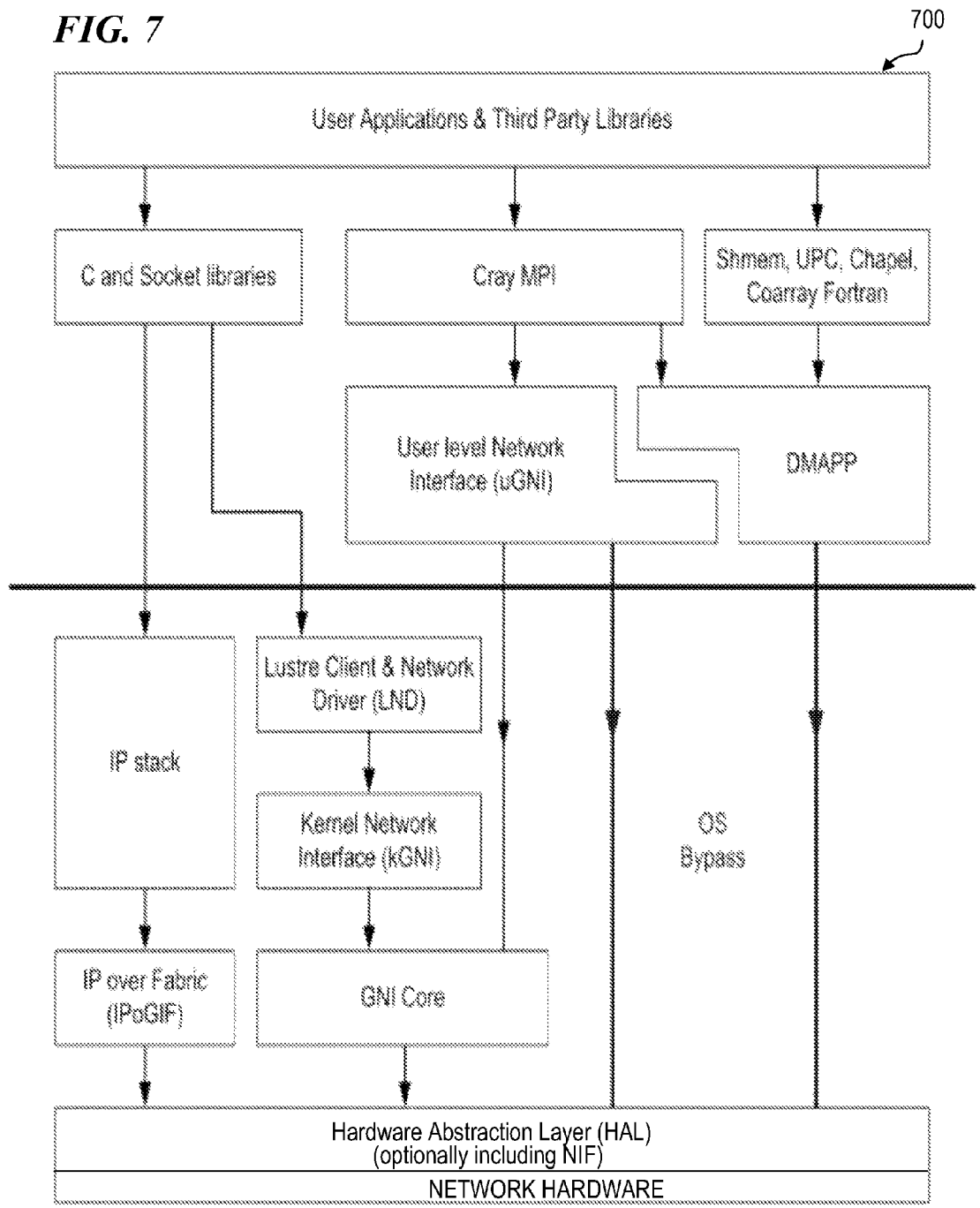
FIG. 7 shows a block diagram of one embodiment using an exemplary network software stack 700.

FIG. 7 shows a block diagram of one embodiment using an exemplary network software stack 700. In some embodiments, a high degree of compatibility is maintained with an existing (e.g., the Cray XE6) system. In some embodiments, implementations of GNI and DMAPP in the software stack used in some embodiments of the present invention build on those for the conventional "Gemini" NIC of the Cray XE6, adding support for new features. Compatibility is maintained for software that uses these interfaces.

In some embodiments, the software of the present invention uses the MPICH2 software code distribution from Argonne National Laboratory. In some embodiments, the MPI (message-passing interface) implementation uses a Nemesis driver for network-router and NIF functions layered over uGNI. (See H. Pritchard, I. Gorodetsky, and D. Buntinas.

"A uGNI based MPICH2 Nemesis Network Module for the Cray XE." In *Proceedings of the* 18th European MPI Users' Group Conference on Recent Advances in the Message Passing Interface, EuroMPI' 11, pp. 110-119, Springer-Verlag, 2011.) Use of FMA (fast memory access) gives MPI applications the ability to pipeline large numbers of small, low-latency transfers—an increasingly important requirement for strong scaling on multicore nodes. Where space is available, intermediate size messages are sent eagerly to pre-allocated system buffers. Large messages are transferred using a rendezvous protocol in which bulk data transfer occurs after matching of an MPI message header and a receive request. Message matching is progressed by each call, or in the case of large messages, using an optional progress thread. The block-transfer engine (BTE) is used to provide high-bandwidth, good overlap of computation and communication, and efficient use of main memory bandwidth. Implementation of latency sensitive collectives, including MPI_Allreduce and MPI_Barrier collective-reduction operations, is optimized using the collective engine described above.

Cray SHMEM (shared memory) provides an explicit one-sided communication model. (See Cray Research, Inc. "SHMEM Technical Note for C," SG-25 16 2.3, 1994.) Each process executes in its own address space but can access segments of the memory of other processes, typically the static data segment and the symmetric heap through a variety of put and get calls, AMO (atomic memory operations) calls, and collectives. Since the Cray T3D system, Cray supercomputers have supported Cray SHMEM. Its implementation for the present invention provides the application programmer with fine-grain control of communication with minimum overhead.

Reduction/Scatter Communication

In some embodiments, all communication between a virtual CE and its children and between a virtual CE and its parent occurs through request packets routed through the network. Therefore the present invention does not impose any restrictions arising from the physical network topology on how CE resources are assigned to a job. The virtual CEs comprising a tree may be distributed throughout the system. A software process running on system endpoint X may be the child of a virtual CE located at endpoint Y, which may, in turn, be a child of a virtual CE located at endpoint Z. Endpoints X, Y, and Z may be any arbitrary endpoints in the system. A software process joins a reduction through the use of an FMA descriptor CE doorbell operation to issue a LEAF-JOIN request to its parent virtual CE. The software process is a leaf-child of that virtual CE. The LEAF-JOIN request includes the opcode of the reduction operation that is to be performed, and the operand or operands that the software process is contributing to the reduction.

The virtual CE performs the specified reduction operation across the operands contributed by all of its children. When it has received a JOIN request targeted to each of its enabled child ports, it issues an INNER-JOIN request to its parent virtual CE. The INNER-JOIN request includes the opcode of the reduction operation being performed and intermediate reduction results.

All participants in the reduction must request the same reduction operation. It is an error for any participant to specify a different operation. Reductions continue up the tree in this manner until the designated root virtual CE has received JOIN requests at each of its enabled child ports, and has computed the final reduction results. The root then begins the scatter process. Scatter requests, containing the reduction results and status are issued to each virtual-CE child. Put requests, containing the reduction results and status are issued to each leaf child, if the root has any, to write the results and status directly into processor memory associated with the leaf child software process. Reduction results and status are passed back down through the tree, in the manner described in the preceding paragraph, until each leaf child has received a copy.

The CE Request Packet Types table below (Table 1) summarizes the types of network request packets used in CE communication in some embodiments.

TABLE 1

| Request Type | Description |
| --- | --- |
| LEAF-JOIN | Generated by FMA, received by a virtual CE. Initiated by a software process writing to an FMA descriptors CE doorbell. |
| INNER-JOIN | Used between virtual CEs to pass intermediate reduction results up toward the root of the reduction tree. |
| SCATTER | Used between virtual CEs to pass final reduction results back down toward the leaves of the tree. |
| PUT | Generated by virtual CEs to write reduction results into processor memory associated with the leaf software processes. |

Reduction/Scatter Tree Configuration

Trees are built up out of individual virtual CEs through MMR configuration, typically performed during job initialization. In some embodiments, CE descriptor MMRs are used to configure the virtual CEs and map the assigned virtual CEs into the reduction/scatter tree. Once the tree has been built, it can be used by the application to perform any number of reduction/scatters. The operation to be performed by each reduction is specified by each software process when it joins the reduction, not during configuration of the tree. Therefore, different reductions may perform different operations without any intervening re-configuration of the tree. While a virtual CE's descriptor is being configured the virtual CE can be disabled by setting the VC_RESET bit in the descriptor to 1. In some embodiments, subsequently, before the virtual CE can participate in a reduction, its VC_RESET bit must be cleared to zero.

Parent Configuration

In some embodiments, each virtual CE in a tree, with the exception of the root, has a parent. Table 2 below lists the CE descriptor fields relevant to parent configuration.

TABLE 2

| Field | Description |
| --- | --- |
| IS_ROOT | If 1, this virtual CE is the root of its tree, and so has no parent; If 0, this virtual CE has a parent. |
| DST, DSTID, NTT | DST, DSTID identify the endpoint network device and NIC within that device containing the parent virtual CE. If NTT = 0, DST, DSTID specify a physical network endpoint ID. If NTT = 1, DST, DSTID specify a virtual endpoint ID which will be translated to a physical network endpoint ID, using the NTT |
| CE_ID | Indicates which virtual CE (0 to 3), at the endpoint specified by DST, DSTID, is this virtual CE's parent. |
| CHILD_ID | Indicates which child (0 to 31) this virtual CE is to its parent. |

Child Configuration

Each virtual CE has 32 child ports. They need not all be used. Table 3 below lists the CE descriptor fields relevant to child configuration.

TABLE 3

| Field | Description |
| --- | --- |
| CHILD_TYPE | For each child port, indicates whether the child port is used, and if it is used, whether the child is a leaf or another virtual CE. No requests are expected at ports for which the child type is "virtual CE". |
| DST_n, DSTID_n, NTT_n | DST, DSTID identify the endpoint network device and NIC within that device associated with the leaf software process, or containing the virtual CE child, associated with child port n. This information is used in returning results to the child. If NTT_n = 0, DST_n, DSTID_n specify a physical network endpoint ID. If NTT_n endpoint ID which will be translated to a physical network endpoint ID, using the NTT |
| CE_ID_n | When the child is a virtual CE, indicates which virtual CE (0 to 3), at the endpoint specified by DST, DSTID, is the child. |

In some embodiments, router 110 includes software and/or hardware that interfaces to high-speed network interconnections (electrical and/or optical signal carriers) in order to form the high-speed network (HSN) interconnecting the nodes of a massively parallel processor (MPP) system.

In some embodiments, the network interface function (NIF) 201 (see FIG. 2) includes a software and/or hardware-implemented facility to move traffic from and to a processor interface 298 to and from the network via a Netlink (NL) function. In some embodiments, due to the size and number of functional units contained within the NIF 201, the NIF 201 is divided into three sub-functions to facilitate the design. The three sub-functions are nic_req, nic_net, and nic_rsp. In some embodiments, each router 110 contains four copies of the NIF 201. Requests that the NIF 201 receives from the processor interface 298 occur as the result of operations performed by software running on the processor that is attached to the processor interface 298. In some embodiments, NIF 201 is implemented entirely in software. In some embodiments, NIF 201 is partially implemented in hardware. In other embodiments, NIF 201 is implemented substantially entirely in hardware.

In some embodiments, the fast-memory-access (FMA) function 222 (also called a remote-memory-access function) provides software with windows into the memory space of the remote endpoints, allowing software running at the local processor to PUT and GET data directly to and from the remote endpoints' memory. In some embodiments, software may also perform atomic memory operations (AMOs) between local operands and remote memory locations using the atomic-memory-operation (AMO) function 232. Using FMA 222, software at the local processor explicitly controls each element of data that is transferred. In some embodiments, the FMA unit function is provided by the NIC.

In some embodiments, block-transfer-engine (BTE) function 223 provides software running at the local processor with the ability to transfer potentially large blocks of data to and from the memory of remote endpoints by issuing just a single transaction request. In using BTE, software is off-loaded from performing the actual element by element data transfer, and so is able to perform other processing while the actual transfer is taking place. In some embodiments, the BTE unit function is provided by the NIC.

In some embodiments, deadlock-avoidance (DLA) function 221 provides deadlock avoidance. In some embodiments, FMA 222 forwards remote memory access requests to the deadlock-avoidance (DLA) function 221. The purpose of the DLA function 221 is to prevent deadlock cycles, involving traffic flows between nodes, by isolating the network's interface (e.g., the boundary between network hardware and the hardware-abstraction-layer (HAL) at the bottom of the software stack 700—see FIG. 7 described below) with the processor from back-pressure exerted by the high-speed network (HSN). In some embodiments, the DLA function 221 includes a large first-in-first-out buffer (FIFO) for absorbing network bound requests. If the rate at which HSN-bound requests, arriving from FMA 222, exceeds the rate at which the network is accepting requests, such that the FIFO becomes full, the DLA 221 discards subsequent requests arriving from FMA 222. In some embodiments, the DLA 221 includes mechanisms to partition the FIFO space between the different FMA descriptors and mechanisms to allow software to interact with the FIFO fill level and to be informed of any discards that may have occurred. The DLA 221 forwards the HSN-bound requests to the transmit arbiter (TARB). In some embodiments, the DLA 221 function is provided by the NIF 201.

In some embodiments, transmit arbiter (TARB) 242 arbitrates the request packets from DLA, BTE, and CE and passes the requests, unmodified, to the synchronization-sequence identification (SSID) 243. In some embodiments, the TARB function is provided by the NIF 201.

In some embodiments, synchronization-sequence identification (SSID) 243 tracks request packet sequences. Each sequence corresponds to a different transaction. Based on special packets that are issued from the request sources (FMA, BTE, CE) to mark the beginning and end of transactions and the particular FMA descriptor, BTE channel, or virtual CE that the packet is associated with, the SSID assigns each request packet destined for the network to its correct sequence and inserts a sequence identifier (ssid value) into the packet. The network-bound request is forwarded on to the outstanding-request buffer (ORB) unit. In some embodiments, the SSID unit function is provided by the NIF 201.

In some embodiments, outstanding-request buffer (ORB) 246 tracks packets. The ORB assigns and inserts a packet ID value into each request forwarded to the Netlink (NL) unit. A response with the same packet ID value is expected to be eventually returned. Fetching requests are expected to return a response that contains data that will be written to the memory of the local processor. For fetching requests, the ORB retains the local address information contained in the request. The local address information will eventually be needed to write the response data to memory. The local address information is stripped off of the request before it is forwarded to the Netlink. In some embodiments, the ORB unit function is provided by the NIF 201.

In some embodiments, remote-address-translation (RAT) function 245 and network-address-translation (NAT) function 241 provide for validation of requests targeting the local processor's memory. Requests targeting the memory of the local processor, such as PUTs and AMOs from remote endpoints, and GET responses, are validated before being delivered to the PI to confirm they are authorized and fall within the bounds of the targeted memory domain. The remote-address-translation (RAT) and network-address-translation (NAT) blocks are involved in the validation. The authorization is performed through a protection-tag (PTAG)/protection-key (PKEY) mechanism. Each network request carries a PKEY value. PKEY values are derived from PTAG values configured by software. For a request to be authorized its PKEY value must correspond to the PTAG value configured for the targeted memory domain. In some embodiments, the RAT and NAT unit functions are provided by the NIF 201.

In some embodiments, NIF 201 supports memory management by providing memory page translation for requests targeting the local processor's memory. The input-output memory-management unit (IOMMU) 235 is involved in this translation. In some embodiments, the IOMMU function is provided by the NIF 201.

Regarding the receive-message table (RMT) 236—the NIF 201 provides mechanisms based on completion queues and interrupt requests for notifying software of significant events, such as the complete reception of a message targeting the local processor, and global visibility of the results of a sequence of requests issued by the local processor. The synchronization-sequence identification (SSID) 243, receive-message table (RMT) 236, and completion-queue (CQ) function 234 are the principal entities involved. Certain types of requests can be tracked by the RMT 236 for the purpose of issuing a completion notification when all requests of a message have been received. If the request is of this type, the RMT updates its table of message state information. (The RMT 236 maps individual request packets to messages based on the source endpoint ID of the request and the ssid value contained in the request.) In some embodiments, the RMT 236 function is provided by the NIF 201.

Regarding the non-posted table (NPT) 233 and atomic memory operation (AMO) 232—in some embodiments, requests received by the NPT 233 are forwarded to the atomic memory operation (AMO) 232. For each request received from the HSN, a response is returned to the source endpoint. The NPT 233 is responsible for forwarding the request's response to the HSN via the Netlink. For fetching requests, the response to the Netlink can only be issued after the data to be returned in the response has been received from the AMO 232, which, in turn, is generally dependent on having received the data from the PI. The NPT is responsible for tracking each request for which a response is outstanding, and for matching each response received from the AMO 232 with the corresponding outstanding request. For non-fetching requests, the NPT 233 can issue the response immediately upon forwarding the request on to the AMO 232, or optionally, can request a response in the request that it forwards to the AMO 232, and only return the response to the Netlink upon receiving the response from the AMO 232. In some embodiments, the NPT 233 and AMO 232 functions are provided by the NIF 201.

The term "node" refers to a memory hierarchy and set of processing resources attached to a single router. In some embodiments, a node may contain one or more processors together with local memory. Local memory refers to the memory hierarchy within a node. In some embodiments, local memory may be part of a cache-coherent domain (an intra-node domain). Remote memory refers to memory on a different node. Local memory can be accessed by a processor at the node using load and store operations.

The term "network endpoint," or simply "endpoint," is usually equivalent to node. In some embodiments, it is possible to have multi-ported nodes. A multi-ported node is one which is connected to more than one router. In the case of a multi-ported node, the terms node and network endpoint are not quite equivalent, as a multi-ported node appears in the system as more than one network endpoint.

A "sequence" is a series of requests sent from one endpoint to another. These requests may consist of PUT, BTE_SEND, or GET packets. In the case of a PUT or BTE_SEND sequence, it may include a message-complete packet. A "message" consists of a sequence and a completion notification at the destination. The completion notification may include a CQ event or flag data write in the case of a PUT or GET message, or an RX Descriptor writeback in the case of a BTE_SEND message. A "transaction" is more broadly interpreted from the perspective of the source. A transaction includes one or more sequences or messages, the mechanisms to initiate those sequences, and a source-side completion notification (SSCN). For example, a transaction may be used to send a single message from the FMA. In this case, the transaction includes the programming of the FMA, the transmission of the message, and the source-side completion notification. However, a transaction could also be used to perform a series of PUT or GET sequences involving different destination endpoints. In this case, the SSCN provides the following information: that the transaction is complete, that all GET responses are visible at the source, and whether or not the transaction was successful.

Collective Engine Description

A "collective engine" (CE) provides the ability to perform rapid reductions of small quantities of data across potentially many software processes running at many network endpoints. In some embodiments, each CE hardware instance supports a small number of virtual CEs. To facilitate scaling, software configures virtual connections among a plurality of virtual CEs such that the virtual CEs are arranged in an inverted-tree structure. The software processes join a reduction by issuing requests to the virtual CEs at the bottom of the tree. The partial reduction results propagate upward toward the root of the tree. The final reduction result propagates back down the tree and is delivered to the participating processes by the virtual CEs at the bottom of the tree.

Although many of the descriptions herein describe embodiments having and using "collective engines," other embodiments of the present invention instead use the more-reconfigurable "virtual collective engines" that are more flexible and capable in how they are configured. Herein, "virtual CE" and "CE" are used interchangeably, and are functionally equivalent. They differ in implementation, which depends on the embodiment of the invention.

In some embodiments, the collective engine receives requests that are initiated by collective engines, and by FMA. The CE requests that a CE receives can come from itself (in the case of a request from one virtual CE to another) or from a CE in a different NIC. The FMA requests that a CE receives can come from the same NIC or from a different NIC. All requests that a CE receives arrive by way of the network. In the case of an FMA-initiated CE request, FMA generates the request in response to a doorbell write that FMA receives from the processor via the processor interface (PI). The request is injected into the network via the TARB, SSID, ORB and Netlink, just like other types of FMA-generated requests. The request traverses the network and arrives at the NIC containing the targeted CE.

In some embodiments, requests destined for a CE, arriving from the network, are received by the RAT in a NIC. If the RAT determines that a received request, based on the type of command contained in the request, is a CE request, the RAT forwards it directly to the CE unit. In some embodiments, the CE generates a PUT-response (a message sent back to the sender of the request) for each request it receives. The CE response is delivered to the Netlink via the NPT. The response traverses the network to arrive back at the NIC where the corresponding request was generated. The received response is delivered to the SSID via the ORB, RAT, and WC, just like any other PUT-response.

In some embodiments, the CE may generate requests as a consequence of requests that it has received. Just like requests generated by FMA and BTE, all CE-generated requests are part of a transaction sequence and are tracked by the SSID. The SSID can generate CQ (completion queue) events on the completion of CE transactions. Typically, the CE is configured such that the SSID is requested to generate a CQ event only if an error occurs during the transaction. The CE's requests are injected into the network via the TARB, SSID, ORB and Netlink, just like requests generated by FMA/DLA and BTE.

In some embodiments, CE-generated requests are either CE-specific requests that are destined for a CE unit or are PUT requests that are destined for processor memory. The path taken by requests that are destined for a CE is as described above. CE-generated PUT requests are used to deliver reduction results back to processor memory. Although the data delivered in the PUT has a CE-specific format, to other functions, there is nothing unique about the PUT. At the destination endpoint it is delivered by the Netlink to the RAT. At the RAT the address in the request undergoes validation and translation via the NAT and IOMMU. From the RAT it passes through the RMT, NPT, AMO, and PARB on its way to the PI. As with any other PUT, a response eventually returns to the SSID that is collocated with the CE that originally generated the PUT.

In some embodiments, a collective engine provides an arithmetic and logic unit to perform data reductions (arithmetic or logical operations) across a collective of many software processes. A collective is formed in a tree structure with the software processes as leaves and CEs as nodes in the tree. See FIG. 1A. Each parent node (a node with children) performs a reduction of the operands sent to it from its children. This tree structure is defined by configuring each participating virtual collective engine, specifying the children it is expected to support, and if it isn't the root, who its parent is. In some embodiments, there is one physical collective engine per NIC, each collective engine having four (4) virtual collective engines, and each virtual collective engine capable of supporting up to 32 children. Each child is either a software process or lower-level parent (a CE). The top of the tree is defined (configured) as the root. Each virtual collective engine performs a reduction of the operands passed to it from its children, when they join the collective. When it has completed its part of the reduction, the result is forwarded up to the next-higher parent or root. In some embodiments, when the virtual collective engine defined as the root completes its part of the reduction, it starts passing the result back down the tree using a scatter or PUT command. A scatter operation is used to send the result to a collective engine. A PUT operation is used to send the data to a software process. When a lower-level parent receives the scatter request, it continues the scatter/PUT process by passing the results to its children. This continues until all the children have received the result.

In other embodiments, there is a plurality of physical collective engines per NIC. In some embodiments, each physical collective engine has 1 to 4 (inclusive) virtual collective engines. In other embodiments, each physical collective engine has 2 to 8 (inclusive) virtual collective engines. In other embodiments, each physical collective engine has 4 to 16 (inclusive) virtual collective engines. In some embodiments, each virtual collective engine supports 4 to 16 (inclusive) children. In other embodiments, each virtual collective engine supports 8 to 32 (inclusive) children. In other embodiments, each virtual collective engine supports 16 to 64 (inclusive) children.

Children joining a collective identify themselves to their parent with an identifier number (in some embodiments, 0 to 31) called the child_id. There are two types of join commands: the first to identify a child as a software process (join), and the second to identify a child as a lower-level parent (inner_join).

Although a given reduction operation is typically limited to a single arithmetic/logic unit (ALU) operation (such as those listed in the following paragraph), the tree structure can be reused with different operations on subsequent collective reductions. Once the leaf child (software process) has received the result from the reduction, it can re-join the same collective (tree) with the same or a different operation.

In some embodiments, ALU operations supported include:
Integer sum: 64-bit and 32-bit operations,
Floating-point sum: 64-bit and 32-bit operations,
Two's complement signed integer min or max: 64-bit and 32-bit operations,
Floating-point min/max: 64-bit and 32-bit operations,
AND: 64-bit and 32-bit operations,
OR: 64-bit and 32-bit operations, and
XOR: 64-bit and 32-bit operations.

Two's-complement signed integer min or max requires two inputs—an operand and an index. The result is the minimum (or maximum) of the operands and the associated index. If the operands are equal, the lesser or greater index would be selected based on an operations modifier.

Floating Point min/max similarly requires two inputs—an operand and an index, the result is the minimum (or maximum) of the operands and the associated index. If the operands are equal, the lesser or greater index would be selected based on an operations modifier.

In some embodiments, a single operand is supplied for mathematical and logical operations in a CE, other than for min/max operations. In other embodiments, one or optionally two (or more) operands can be supplied for each operation, other than for min/max operations. In other embodiments, up to four 32-bit operands can be supplied for each operation, other than for min/max operations. For example, in some embodiments, a 64-bit addition can be accomplished by passing two 32-bit parts for each operand, and performing a 32-bit addition on the low-order 32-bit part of the incoming two parts and the low-order accumulating sum in the CE, and then another 32-bit addition on the high-order 32-bit parts along with the carry result from the low-order 32-bit operation. Similarly, in some embodiments, a 128-bit addition can be accomplished by passing two 64-bit parts for each operand, and performing a 64-bit addition on the low-order 64-bit parts (low-order incoming and low-order accumulating sum) and another 64-bit addition on the high-order 64-bit parts (high-order incoming and high-order accumulating sum) along with the carry result from the low-order 64-bit operation. In other embodiments, in trees that use narrow interconnections between CEs, the lowest-order bit or bits are passed in a first part of the collective operand, and a plurality of additional successively higher-order bits are successively passed and the parent collective engine performs a succession of arithmetic/ logical operations on the successive incoming parts, and then serially passes the result parts to its parent collective node.

In some embodiments, the collective operation specifies a vector operation that is performed on a plurality of vector operands, each vector operand including a plurality of vector elements. The set of child-results received into the parent network node of the first one of the plurality of collective engines from a child collective engine includes a vector result for each of the plurality of vector operands that are each passed between network nodes. The vector operation is performed on each respective vector element of the incoming vectors, and the resulting collective vector result, when complete, is passed to that CE's parent node as a vector operand. For example, an add operation could be specified, and each operand could be, for example, a 64-bit piece of data that is interpreted as four 16-bit elements of a four-element vector, and four 16-bit add operations are performed in parallel by a 64-bit ALU that does not pass carries between the 16-bit elements. Of course, other examples include vectors that include a plurality of 32-bit or 64-bit elements that are passed as a series of data parts of the vectors.

In some embodiments, the operation to be performed in an ALU during a reduction is specified in the join and inner_join commands. The join and inner_join commands contain both the operation and an operand (or operands). In some embodiments, all join and inner_join commands in a single reduction must specify the same operation (for example, floating point sum, or AND). If all join and inner_join command do not specify the same operation, an error is detected, the reduction is not completed, and an error indication is returned to the leaf software processes. In other embodiments, no error checking is performed. In other embodiments, all join and inner join commands in a single reduction are not required to specify the same operation. In other embodiments, the operation to be performed in a reduction is specified when a reduction tree of CEs is configured.

Each virtual CE is independent of the others and requires individual configuration to become a functional part of a collective tree. In some embodiments, the programmer needs to identify which children (0 to 31) are to be used (holes are allowed, that is, child_ids do not have to be consecutively or completely used), whether a particular software process is a leaf software process or another virtual CE (lower-level parent), and, if not defined as the root, where to send its join (the location of the CE's parent) when the CE has completed its part of the reduction.

In some embodiments, the information contained in a join or inner_join request includes: the identification number (0 to 31) or child_id of the child, which virtual CE to use (ce_id), a collective reduction identifier, an operations modifier for min or max operations, the data to be processed, and some status fields.

Incoming joins and scatters come from the remote-address-translation (RAT) unit. See FIG. 3. Responses are generated after checking for errors and are sent to the NPT. After the reduction has completed by a virtual CE not configured as the root, an inner_join and its data are sent to the virtual CE defined as its parent via the transmit arbiter (TARB). If the virtual CE is defined as a root, selected information either saved from the join or from the configuration data is used to generate the scatter or PUT commands to send the result to its children via the TARB. If not defined as a root a scatter must be received with the reduction result to start the virtual CE sending scatters or PUTs to its children.

In some embodiments, a processor joins a collective by storing to a fast-memory-access (FMA) doorbell which creates and sends the join request to the desired parent virtual CE. When a virtual CE (not defined as the root) completes its part of the reduction, it sends an inner_join request to its parent virtual CE. The data packet sent with the request contains a 64-bit collective control word (CCW) which contains information necessary to join the collective and status fields, the other words contain the operands or index (for min or max operations). As joins are received, selected header data fields and some pre-configured data are saved in a join list register to be used to form the scatter command to lower-level parents or PUT commands to a software process (leaf cell). The operand data is temporarily held in another register while the reduction is performed. In some embodiments, the four (4) virtual CEs contend for a single ALU, which accepts input in a time-slice fashion. A bypass is provided that allows the output of the ALU to be directly fed back into the ALU as one operand, if another saved operand is ready. In some embodiments (such as shown in FIG. 5), the first operand and index are saved in partial-result latches. Subsequent new operands/indices along with the partial results are sent to the ALU with the result accumulated in these partial-result latches. The joinlist contains selected information from the join and configuration data to form the scatter or PUT requests at reduction conclusion.

In some embodiments, each virtual CE is configured by memory-mapped registers (MMR). If defined as a root, the end of its reduction phase initiates a scatter operation using the saved join list data to send the appropriate command to its children. If not defined as the root, it waits for receipt of a scatter command with the result data to initiate its scatter operation to either lower-level parents or software processes. After receipt of the result the software process can initiate a join to the same collective for a different reduction (using the same ALU operation, or a different one). A collective reduction is only completed when all the expected members have successfully joined the collective. How many, and who, are defined by loading the configuration MMRs. As joins are received, the headers and collective control word (CCW) are checked for errors. Some detected errors will cause the join to be rejected with an error response sent to the non-posted table (NPT) and the virtual CE left waiting for all the members to join. If the reduction does complete even though errors were detected or floating point exceptions were encountered, status information is reported in the CCW of the data packet and sent with the inner_join, scatter, or PUT.

In some embodiments, if the programmer decides to only define one child of the 32 available, the reduction result will be the operand/s and /or index supplied by the child that joined, as there are no other children to calculate a reduction on.

A reduction tree is formed by defining each participating collective engine's position in the tree by constructing a control block in memory containing necessary configuration information. In some embodiments, wherein the CEs are implemented in hardware, this configuration control block information is loaded by the software into the CE's MMRs. In some embodiments, the following information is used by each virtual CE to perform its part of a reduction:

vc_reset (disable)—When set to one, resets only the logic specific to the virtual CE and while active indicates that this virtual CE is disabled. Allows the programmer the ability to hold off any possible joins while the virtual CE is being configured.

ptag—(memory protection tag) Used by the virtual CE when issuing inner_joins, scatters, and PUTs, and later converted to a pkey.

pkey—Used to verify incoming joins and scatters.

is_root—defines this virtual CE as the root of the tree.

parent identification_information necessary to direct a request to the parent/root of this virtual CE:

ce_id=the virtual CE to use at the parent ntt=if the Node Translation Table will be used dstid[1:0]=the endpoint NIC dst[15:0]=to identify the physical chip child_count[5:0]—The total number of children expected to join. Used to determine when the reduction is complete, and must equal the count of inner and leaf joins specified in child configuration.

child_type[1:0]—for each of the 32 possible children the programmer wants to participate in a reduction, indicates the type of join (leaf or inner) to expect (1=leaf, 2=inner (another CE), 0=disabled/not participating, 3=invalid).

child information—data necessary to direct a request back to each of the 32 children when doing the scatter operation (ce_id,ntt,dstid,dst).

rc[2:0]—Describes how to route the packet over the network.

ssid_lcqh[10:0]—completion queue handle to which the local CQE notification is to be sent.

ssid_nsrc[1:0]—notify source.

Floating point rounding mode[1:0]—0=round to nearest, 1=round down, 2=round up, 3=round to zero.

In some embodiments, including some embodiments wherein the CE is implemented in hardware, the collective engine external interfaces include those in the following Table 4:

TABLE 4

| I/O | Name | Description |
|---|---|---|
| System Interface | | |
| input | cclk | NIC clock |
| input | i_reset | NIC configuration reset |
| input | i_warm_reset | NIC logic reset |
| Local Block Interface | | |
| output | r_q_ce_lb_hss_irq | HSS interrupt flag |
| Processor Interface (PI) Interface | | |
| output | r_q_ce_pi_os_irq | OS interrupt flag |
| Remote Address Translation (RAT) Interface | | |
| input | i_rat_ce_req_flit[143:0] | Network request |
| input | i_rat_ce_req_sb[1:0] | Network request side band |
| output | r_q_ce_rat_req_ack | Acknowledge receipt of request |
| Non-Posted Table (NPT) Interface | | |
| output | r_q_ce_npt_rsp_flit[143:0] | Response header |
| output | r_q_ce_npt_rsp_sb[1:0] | Response header side band |
| input | i_npt_ce_rsp_ack | Acknowledge receipt of response header |
| Transmit Arbiter (TARB) Interface | | |
| output | r_q_ce_tarb_req_flit[143:0] | Network request |
| output | r_q_ce_tarb_req_sb[1:0] | Network request side band |
| input | i_tarb_ce_req_ack | Acknowledge receipt of request |

TABLE 4-continued

| I/O | Name | Description |
|---|---|---|
| Network Monitor Interface | | |
| input | i_netmon_ce_ring[15:0] | MMR ring input request |
| output | r_q_ce_netmon_ring[15:0] | MMR ring output response |
| output | r_q_ce_netmon_ring_wrack | MMR ring write acknowledge |
| output | r_q_ce_netmon_cntr_inc[9:0] | Event counter increment |
| input | i_netmon_ce_select0[7:0] | Data select for data0 |
| input | i_netmon_ce_select1[7:0] | Data select for data1 |
| output | r_q_ce_netmon_data0[145:0] | Data selected by select0 |
| output | r_q_ce_netmon_data1[145:0] | Data selected by select1 |

The collective engine (CE) provides support for performing reduction/scatter operations. The CE is well suited to performing fast reductions on small quantities of data, so can be used to implement efficient barrier operations. In some embodiments, the CE is implemented in software. In some embodiments, some aspects of the CE are implemented partially in hardware to provide a further performance assist for the software. In other embodiments, the CE is implemented substantially entirely within integrated circuitry. In some embodiments, the CE functional unit implemented in each NIF provides four virtual CEs (also simply referred to as CEs) and each virtual CE supports 32 child ports. A number of virtual CEs can be arranged in an inverted-tree structure with sufficient ports at the bottom level to span the processes in a job. FIG. 1C provides a representation of a reduction/scatter tree formed from interconnected virtual CEs. In some embodiments, the CE supports common logical, integer, and floating-point operations on 32-bit and 64-bit operands. The full set of operations supported, in some embodiments, is listed below in the following Table 5:

TABLE 5

| Operation | Description | Number of Operands Required | CE_OPRND1 Size | CE_PRND2 Size |
|---|---|---|---|---|
| AND | Logical AND | one | 64-bit | 64-bit |
| AND_S | Logical AND, short | one | 32-bit | 32-bit |
| OR | Logical OR | one | 64-bit | 64-bit |
| OR_S | Logical OR, short | one | 32-bit | 32-bit |
| XOR | Logical Exclusive OR | one | 64-bit | 64-bit |
| XOR_S | Logical Exclusive OR, short | one | 32-bit | 32-bit |
| IADD | Integer two's complement ADD | one | 64-bit | 64-bit |
| IADD_S | Integer two's complement ADD, short | one | 32-bit | 32-bit |
| IMAX_LIDX | Integer signed two's complement Maximum. two The lowest index is returned if there are multiple greatest comparands. | | 64-bit comparand | 64-bit index |
| IMAX_LIDX_S | Integer signed two's complement Maximum,two short. The lowest index is returned if there are multiple greatest comparands. | | 32-bit comparand | 64-bit index |
| IMIN_LIDX | Integer signed two's complement Minimum. two The lowest index is returned if there are multiple lowest comparands. | | 64-bit comparand | 64-bit index |
| IMIN_LIDX_S | Integer signed two's complement Minimum, two short. The lowest index is returned if there are multiple lowest comparands. | | 32-bit comparand | 64-bit index |
| IMAX_GIDX | Integer signed two's complement Maximum.two The greatest index is returned if there are multiple greatest comparands. | | 64-bit comparand | 64-bit index |
| IMAX_GIDX_S | Integer signed two's complement Maximum,two short. The greatest index is returned if there are multiple greatest comparands. | | 32-bit comparand | 64-bit index |
| IMIN_GIDX | Integer signed two's complement Minimum. two The greatest index is returned if there are multiple lowest comparands. | | 64-bit comparand | 64-bit index |
| IMIN_GIDX_S | Integer signed two's complement Minimum,two short. The greatest index is returned if there are multiple lowest comparands. | | 32-bit comparand | 64-bit index |
| FPADD | Floating point ADD | one | 64-bit | 64-bit |
| FPADD_S | Floating point ADD, single precision | one | 32-bit | 32-bit |

TABLE 5-continued

| Operation | Description | Number of Operands Required | CE_OPRND1 Size | CE_PRND2 Size |
|---|---|---|---|---|
| FPMAX_LIDX | Floating point Maximum. Lowest index returned if there are multiple greatest comparands. | two | 64-bit comparand | 64-bit index |
| FPMAX_LIDX_S | Floating point Maximum, single precision. Lowest index returned if there are multiple greatest comparands. | two | 32-bit comparand | 64-bit index |
| FPMIN_LIDX | Floating point Minimum. Lowest index returned if there are multiple lowest comparands. | two | 64-bit comparand | 64-bit index |
| FPMIN_LIDX_S | Floating point Minimum, single precision. The lowest index is returned if there are multiple lowest comparands. | two | 32-bit comparand | 64-bit index |
| FPMAX_GIDX | Floating point Maximum. The greatest index is returned if there are multiple greatest comparands. | two | 64-bit comparand | 64-bit index |
| FPMAX_GIDX_S | Floating point Maximum, single precision. The greatest index is returned if there are multiple greatest comparands. | two | 32-bit comparand | 64-bit index |
| FPMIN_GIDX | Floating point Minimum. The greatest index is returned if there are multiple lowest comparands. | two | 64-bit comparand | 64-bit index |
| FPMIN_GIDX_S | Floating point Minimum, single precision. The greatest index is returned if there are multiple lowest comparands. | two | 32-bit comparand | 64-bit index |

In some embodiments, all communication between a virtual CE and its children, and between a virtual CE and its parent, occurs through request packets routed through the high-speed network. Therefore the network hardware does not impose any restrictions arising from the physical network topology on how CE resources are assigned to a job. The virtual CEs comprising a tree may be distributed throughout the system. A software process running on system endpoint X may be the child of a virtual CE located at endpoint Y, which may, in turn, be a child of a virtual CE located at endpoint Z. Endpoints X, Y, and Z may be any arbitrary endpoints in the system.

In some embodiments, a software process joins a reduction operation by sending a LEAF-JOIN request message to its parent virtual CE. In some embodiments, wherein the CE is implemented in integrated circuitry, a software process joins a reduction through the use of an FMA descriptor and a CE doorbell operation to issue a LEAF-JOIN request to its parent virtual CE. The software process is a leaf-child of that virtual CE. In some embodiments, the LEAF-JOIN request includes an opcode for the reduction operation that is to be performed, and the operand or operands that the software process is contributing to the reduction.

The virtual CE performs the specified reduction operation across the operands contributed by all of its children. When it has received a JOIN request targeted to each of its enabled child ports, it issues an INNER-JOIN request to its parent virtual CE. In some embodiments, the INNER-JOIN request includes the opcode of the reduction operation being performed and intermediate reduction results. In some embodiments, all participants in the reduction must request the same reduction operation and it is an error for any participant to specify a different operation.

In some embodiments, reductions continue up the tree in this manner until the designated root virtual CE has received JOIN requests at each of its enabled child ports, and has computed the final reduction results. In some embodiments, the root then begins the scatter process. Scatter requests, containing the reduction results and status, are issued to each virtual-CE child. Put requests, containing the reduction results and status, are issued to each leaf child (a software process), if the root has any, to write the results and status directly into processor memory associated with the leaf child software process. Reduction results and status are passed back down through the tree, in the manner described above, until each leaf child has received a copy.

In some embodiments, trees are built up by software out of individual virtual CEs through configuration, typically performed during job initialization. Once the tree has been built, it can be used by the application to perform any number of reduction/scatters. The operation to be performed by each reduction is specified by each software process when it joins the reduction, not during configuration of the tree. Therefore, different reductions may perform different operations without any intervening re-configuration of the tree.

In some embodiments, while a virtual CE's descriptor is being configured the virtual CE can be disabled. Subsequently, before the virtual CE can participate in a reduction, it must be re-enabled.

In some embodiments, the virtual CE may be located at the endpoint attached to the node where the software process is running, or may be located at a different endpoint in the system. CE_ID (in some embodiments, written as ce_id) identifies the particular virtual CE at the target endpoint. CHILD_ID (in some embodiments, written as child_id) identifies the child port of the virtual CE with which the software process is associated. Within a reduction, every JOIN request must arrive at a different child port within the reduction tree.

The operation that is to be performed across the operands contributed by all processes joining the reduction is specified by the collective-engine opcode (CE_OP). In some embodiments, for a particular reduction, all processes must specify the same value for CE_OP. For a particular reduction, each process may contribute one or two operands; all processes must each contribute the same number of operands. The number of operands being contributed is specified by a field in the memory-mapped CE configuration registers (CE MMRs).

In some embodiments, with the exception of all variants of the MIN and MAX operations, only one operand is required, but if two operands are provided the specified operation is performed independently on each of the two operands. For example, if the operation is IADD, the result will contain two sums. The first will be the sum of the first operand values contributed by each process. The second will be the sum of the second operand values contributed by each process. All variants of the MIN and MAX operations require two operands. The first operand is the comperand. The second operand is an index. If the operation is a variant of MIN, the result includes the minimum first operand value from amongst those contributed by all of the processes. If the operation is a variant of MAX, the result includes the maximum second operand value from amongst those contributed by all of the processes. The result also includes the second operand index value contributed by whichever process contributed the overall minimum or maximum first operand value. If the same overall minimum (maximum) comperand value is contributed by more than one process, the index value that is included in the result is the lowest (for the LIDX variants of MIN/MAX) or the greatest (for the GIDX variants of MIN/MAX) index value from amongst the set of index values corresponding to the equally minimum (maximum) comperand values.

In some embodiments, the present invention provides a data-processing system for performing collective operations, wherein the system includes a plurality of leaf software processes; a plurality of collective engines; a network, wherein messages (which specify one or more collective operations) are sent from each one of the plurality of leaf software processes to its respective collective engine, and result messages from each of the plurality of leaf-associated collective engines are sent over the network through the hierarchy configured in the plurality of collective engines, and ultimately to a root software process. The system uses a dynamically configurable hierarchy-definition facility, wherein a hierarchy includes a root collective engine, a plurality of leaf-collective engines and the capability for inserting one or more intermediate levels of collective engines and wherein data operands and collective-operation specifications (the specification of which arithmetic/logical operation is to be performed) are passed from each leaf to its parent collective engine, which verifies (checks) that the specified arithmetic/logical collective operation from each leaf matches the desired operation (i.e., that the specifications are all for the same operation) for the collective tree. Once all the results from the children of a node are received and the operations are performed, the result and the specification of the collective operation are passed "upward" (this direction is the up direction in FIG. 1C) to its parent node (until the final result is collected in the root node and passed to its software process). In some embodiments, the final result is then passed using network messages back down the tree to all the leaf processes.

In some embodiments, the present invention provides a data-processing system for performing collective operations, wherein the system includes a plurality of leaf software processes; a first plurality of collective engines dynamically configured by a hierarchy-setup software process into a plurality of subsets that change over time, wherein the plurality of collective engines are interconnected to one another on a network, and wherein when each subset of the plurality of subsets of collective engines is formed, that subset is configured by the software process into a hierarchy of collective engines, wherein each hierarchy includes: (a collective engine configured as a root collective engine, and a first plurality of collective engines configured as leaf collective engines that are each connected to an intermediate level of collective engines, configured as parent collective engines, wherein the intermediate level of collective engines is between the root collective engine and the first plurality of leaf collective engines, wherein each collective engine in the hierarchy except the root collective engine is configured by the hierarchy-setup software process to have a parent collective engine, and wherein each non-leaf collective engine in the hierarchy is configured by the hierarchy-setup software process to have a set of child collective engines); a message-passing facility that passes collective-operations messages over the network between collective engines; and a software-accessible interface that receives a specification of an operation and input operand data into each of the first plurality of leaf collective engines from leaf software processes, and a specification for each collective engine to send result operand data and the specification of the operation from the leaf collective engines toward a root software process connected to the root collective engine, wherein each collective engine in its hierarchy receives a plurality of messages, each message containing input-operand data and the specification of the arithmetic-logical operation to be performed, repeatedly performs the specified operation to produce result data, and outputs the result data to its parent collective engine, and wherein the root collective engine conveys final result data to the root software process.

Some embodiments differentiate between software processes, which run on processors, and collective engines, which are implemented (in those embodiments) in hardware. In such embodiments, each leaf is a software process, no matter what node it is run on, and no matter what CE it is attached to. Accordingly, the root CE can have a leaf (that is, the software process associated with the root CE is considered a leaf). The CE tree and configuration is set up by a hierarchy software process, and software processes attached to leaf CEs in the tree contribute operand data to the CEs in the tree, and when a final result is obtained by the root, the root sends the final result to the tree and those software processes attached to leaf CEs then receive the final result from the tree. The software processes can be attached to CEs at any level in the tree, but are not considered as part of the tree in these embodiments.

In some embodiments, the present invention provides a data-processing system for performing collective operations. This data-processing system includes a plurality of network nodes, a first plurality of processors, and a first plurality of collective engines (CEs), wherein each one of the plurality of network nodes is coupled to one of the first plurality of processors, wherein each one of the plurality of network nodes includes one of the first plurality of collective engines, and wherein each of the first plurality of collective engines is configurable to specify a parent network node of that respective collective engine; as well as a network that interconnects the plurality of network nodes; and a memory operatively coupled to the first plurality of processors. The memory contains instructions of a software process that, when executed by a given one of the first plurality of processors, cause that given processor to: determine (in the parent network node of a first one of the plurality of collective engines) a subset of other network nodes of the system that are to be used to execute a collective operation, logically arrange the subset of other network nodes into a hierarchical structure, transmit the collective operation to the subset of other network nodes based on the hierarchical structure via at the network, receive, into the parent network node of the first one of the plurality of collective engines, a set of results from the execution of the collective operations from the subset of the other processor nodes, perform the collective operation on the received set of results to generate a final collective result; and pass the final collective result to the software process.

In some embodiments, the system further passes the final collective result to each network node of the first subset of other network nodes of the system.

In some embodiments, the system further implements a plurality of virtual collective engines in each of the first plurality of collective engines.

In some embodiments of the system, the collective operation specifies a reduction operation that is performed on a plurality of parts of operands, and where the set of results received into the parent network node of the first one of the plurality of collective engines includes operands that are each passed between network nodes as a series of the parts of each respective operand.

In some embodiments of the system, the collective operation specifies a vector reduction operation that is performed on a plurality of vector operands, each vector operand including a plurality of vector elements, and where the set of results received into the parent network node of the first one of the plurality of collective engines includes a vector result for each of the plurality of vector operands that are each passed between network, and wherein the specified vector reduction operation is performed on each respective vector element.

In some embodiments of the system, each collective engine checks the specifications of reduction operations received with the operand data from its child collective engines, and signals an error if not all the specifications are equal.

In some embodiments, the system further implements a plurality of virtual collective engines in each of the first plurality of collective engines, and wherein a plurality of independent collective trees are formed from hierarchies of different subsets of virtual engines.

In other embodiments, the present invention provides a data-processing system for performing collective operations, the system including a plurality of leaf software processes; a first plurality of collective engines dynamically configured by a hierarchy-setup software process into a plurality of subsets that change over time, wherein the plurality of collective engines are interconnected to one another on a network, and wherein when each subset of the plurality of subsets of collective engines is formed, that subset is configured by the software process into a hierarchy of collective engines. Each hierarchy includes a collective engine configured as a root collective engine, and a first plurality of collective engines configured as leaf collective engines that are each connected to an intermediate level of collective engines, configured as parent collective engines, wherein the intermediate level of collective engines is between the root collective engine and the first plurality of leaf collective engines, wherein each collective engine in the hierarchy except the root collective engine is configured by the hierarchy-setup software process to have a parent collective engine, and wherein each non-leaf collective engine in the hierarchy is configured by the hierarchy-setup software process to have a set of child collective engines. This system also includes a message-passing facility that passes collective-operations messages over the network between collective engines; and a software-accessible interface that receives a specification of a reduction operation and input operand data into each of the first plurality of leaf collective engines from leaf software processes, and a specification for each collective engine to send result operand data and the specification of the reduction operation from the leaf collective engines toward a root software process connected to the root collective engine, wherein each collective engine in its hierarchy receives a plurality of messages, each message containing input-operand data and the specification of the reduction operation to be performed, repeatedly performs the specified reduction operation to produce result data, and outputs the result data to its parent collective engine, and wherein the root collective engine conveys final result data to the root software process. In some embodiments, the root collective engine of each hierarchy also conveys the final result data to each of the first plurality of leaf collective engines of that hierarchy. In some embodiments, each collective engine is a virtual collective engine. In some embodiments, each collective engine has functionality to perform a reduction operation on a plurality of independent data elements simultaneously. In some embodiments, the plurality of collective operations includes a reduction operation; and in some such embodiments, the collective reduction operation includes at least one operand, and the collective reduction operation is at least one of the set consisting of add, min, max, min loc, max loc, and no-op reduction operations. In some embodiments, the plurality of collective operations includes a multicast one to all collective operation. In some embodiments, the plurality of collective operations includes a barrier collective operation. In some embodiments, error checking is performed on specification of the reduction operation that is specified with operand data.

In yet other embodiments, the present invention provides a data-processing system for performing collective operations, wherein the system includes a root processor node; a plurality of leaf processor nodes; a network that passes messages containing configuration information and messages that contain operand data and specifications of collective operations to be performed; and a plurality of collective engines, logically configured in a hierarchical structure, wherein the hierarchical structure includes a first level of collective engines and a second level of collective engines, wherein the collective engines of the first layer are logically connected to leaf processor nodes, and wherein the collective engines of the second layer are logically connected to the root processor node, wherein the plurality of collective engines receive the messages that contain the operand data and the specifications of collective operations to be performed, check that the specifications of collective operations to be performed are equal to one another and signal error if not, and perform the specified collective operation on the received operand data and pass reduction results to a parent collective engine of plurality of collective engines, and wherein a final result is produced by the root processor node. In some embodiments, the root processor node and the leaf processor nodes are operable to simultaneously participate in each of a plurality of hierarchical structures. In some embodiments, the final result is transmitted back to all nodes in the hierarchical structure. In some embodiments, the result of the collective reduction operation is checked for errors.

In some embodiments, the present invention provides a data-processing method for performing a collective operation using a plurality of network nodes, a first plurality of processors, and a first plurality of collective engines, wherein each one of the plurality of network nodes is coupled to one of the first plurality of processors, wherein each one of the plurality of network nodes includes one of the first plurality of collective engines, and wherein each of the first plurality of collective engines is configurable to specify a parent network node of that respective collective engine; a network that interconnects the plurality of network nodes; and a memory operatively coupled to the first plurality of processors. This method includes determining, in the parent network node of a first one of the plurality of collective engines, a first subset of other network nodes of the system that are to be used to execute a collective reduction operation; logically arranging the subset of other network nodes into a hierarchical structure; transmitting a specification of the collective reduction operation to the subset of other network nodes based on the hierarchical structure via at the network; receiving, into the parent network node of the first one of the plurality of collective engines, a set of results from the execution of the collective reduction operations from the subset of the other processor nodes; performing the collective reduction operation on the received set of results to generate a final collective reduction result; and passing the final collective reduction result to the software process.

Some embodiments of the method further include passing the final collective result to each network node of the first subset of other network nodes of the system.

Some embodiments of the method further include implementing a plurality of virtual collective engines in each of the first plurality of collective engines.

Some embodiments of the method further include specifying a reduction operation that is performed on a plurality of parts of operands, and where the set of results received into the parent network node of the first one of the plurality of collective engines includes operands that are each passed between network nodes as a series of the parts of each respective operand.

Some embodiments of the method further include specifying a vector reduction operation that is performed on a plurality of vector operands, each vector operand including a plurality of vector elements, and where the set of results received into the parent network node of the first one of the plurality of collective engines includes a vector result for each of the plurality of vector operands that are each passed between network, and wherein the specified vector reduction operation is performed on each respective vector element.

Some embodiments of the method further include checking the specifications of reduction operations received with the operand data from its child collective engines, and signaling an error if not all the specifications are equal.

Some embodiments of the method further include implementing a plurality of virtual collective engines in each of the first plurality of collective engines, and wherein a plurality of independent collective trees are formed from hierarchies of different subsets of virtual engines.

To be clear, the CEs of the present invention are not tied to the software running on any particular processor nodes. The CEs are considered part of the network. While the CEs reside on processor boards in some embodiments of the network implementation, the function (i.e., the collective trees and their topology) is contained in the NIFs and are considered part of the network in those embodiments. The CE hierarchy is determined by software and is not constrained by the physical network interconnections. In some embodiments, the CEs are running in NIFs on network endpoints rather than processor nodes.

It is to be understood that the above description is intended to be illustrative, and not restrictive. Although numerous characteristics and advantages of various embodiments as described herein have been set forth in the foregoing description, together with details of the structure and function of various embodiments, many other embodiments and changes to details will be apparent to those of skill in the art upon reviewing the above description. The scope of the invention should be, therefore, determined with reference to the appended claims, along with the full scope of equivalents to which such claims are entitled. In the appended claims, the terms "including" and "in which" are used as the plain-English equivalents of the respective terms "comprising" and "wherein," respectively. Moreover, the terms "first," "second," and "third," etc., are used merely as labels, and are not intended to impose numerical requirements on their objects.

What is claimed is:

1. A data-processing system for performing collective operations, the system comprising:
a plurality of network nodes, a first plurality of processors, and a first plurality of collective engines, wherein each one of the plurality of network nodes is coupled to one of the first plurality of processors, wherein each one of the plurality of network nodes includes one of the first plurality of collective engines, and wherein each of the first plurality of collective engines is configurable to specify a parent network node of that respective collective engine;
a network that interconnects the plurality of network nodes; and
a memory operatively coupled to the first plurality of processors, wherein the memory contains instructions of a software process that, when executed by a given one of the first plurality of processors, cause that given processor to:
determine, in the parent network node of a first one of the plurality of collective engines, a first subset of other network nodes of the system that are to be used to execute a collective operation,
logically arrange the subset of other network nodes into a hierarchical structure,
transmit the collective operation to the subset of other network nodes based on the hierarchical structure via at the network, and
receive, into the parent network node of the first one of the plurality of collective engines, a set of results from the execution of the collective operations from the subset of the other processor nodes;
perform the collective operation on the received set of results to generate a final collective result; and
pass the final collective result to the software process,
wherein the collective operation specifies a vector reduction operation that is performed on a plurality of vector operands, each vector operand including a plurality of vector elements, and where the set of results received into the parent network node of the first one of the plurality of collective engines includes a vector result for each of the plurality of vector operands that are each passed between network, and wherein the specified vector reduction operation is performed on each respective vector element.

2. The data-processing system of claim 1, wherein the collective operation specifies an integer signed two's complement minimum operation that returns a lowest index if there are multiple lowest comparands.

3. The data-processing system of claim 1, wherein the collective operation specifies an integer signed two's complement maximum operation that returns a greatest index if there are multiple greatest comparands.

4. The data-processing system of claim 1, wherein the collective operation specifies a floating point minimum operation that returns a lowest index if there are multiple lowest comparands.

5. The data-processing system of claim 1, wherein the collective operation specifies a floating point maximum operation that returns a greatest index if there are multiple greatest comparands.

6. The data-processing system of claim 1, wherein the collective operation specifies an add operation, wherein each operand is a 64-bit piece of data that is interpreted as four 16-bit elements of a four-element vector, and wherein four 16-bit add operations are performed in parallel by a 64-bit arithmetic-logical unit that does not pass carries between the 16-bit elements of the four-element vector.

7. The data-processing system of claim 1, wherein each collective engine checks the specifications of reduction operations received with the operand data from its child collective engines, and signals an error if not all the specifications are equal.

8. The data-processing system of claim 1, wherein each collective engine has functionality to perform a reduction operation on a plurality of independent data elements simultaneously.

9. A data-processing system for performing collective operations, the system comprising:
   a plurality of network nodes, a first plurality of processors, and a first plurality of collective engines, wherein each one of the plurality of network nodes is coupled to one of the first plurality of processors, wherein each one of the plurality of network nodes includes one of the first plurality of collective engines, and wherein each of the first plurality of collective engines is configurable to specify a parent network node of that respective collective engine;
   a network that interconnects the plurality of network nodes; and
   a memory operatively coupled to the first plurality of processors, wherein the memory contains instructions of a software process that, when executed by a given one of the first plurality of processors, cause that given processor to:
     determine, in the parent network node of a first one of the plurality of collective engines, a first subset of other network nodes of the system that are to be used to execute a collective operation,
     logically arrange the subset of other network nodes into a hierarchical structure,
     transmit the collective operation to the subset of other network nodes based on the hierarchical structure via at the network, and
     receive, into the parent network node of the first one of the plurality of collective engines, a set of results from the execution of the collective operations from the subset of the other processor nodes;
   perform the collective operation on the received set of results to generate a final collective result; and
   pass the final collective result to the software process,
   wherein each collective engine checks the specifications of reduction operations received with the operand data from its child collective engines, and signals an error if not all the specifications are equal.

10. A data-processing system for performing collective operations, the system comprising:
   a plurality of leaf software processes;
   a first plurality of collective engines dynamically configured by a hierarchy-setup software process into a plurality of subsets that change over time, wherein the plurality of collective engines are interconnected to one another on a network, and wherein when each subset of the plurality of subsets of collective engines is formed, that subset is configured by the software process into a hierarchy of collective engines, wherein each hierarchy includes:
     a collective engine configured as a root collective engine, and
     a first plurality of collective engines configured as leaf collective engines that are each connected to an intermediate level of collective engines, configured as parent collective engines, wherein the intermediate level of collective engines is between the root collective engine and the first plurality of leaf collective engines, wherein each collective engine in the hierarchy except the root collective engine is configured by the hierarchy-setup software process to have a parent collective engine, and wherein each non-leaf collective engine in the hierarchy is configured by the hierarchy-setup software process to have a set of child collective engines;
   a message-passing facility that passes collective-operations messages over the network between collective engines; and
   a software-accessible interface that receives a specification of a reduction operation and input operand data into each of the first plurality of leaf collective engines from leaf software processes, and a specification for each collective engine to send result operand data and the specification of the reduction operation from the leaf collective engines toward a root software process connected to the root collective engine, wherein each collective engine in its hierarchy receives a plurality of messages, each message containing input-operand data and the specification of the reduction operation to be performed, repeatedly performs the specified reduction operation to produce result data, and outputs the result data to its parent collective engine, and wherein the root collective engine conveys final result data to the root software process,
   wherein each collective engine has functionality to perform a reduction operation on a plurality independent data elements simultaneously.

11. A data-processing system for performing collective operations, the system comprising:
   a plurality of leaf software processes;
   a first plurality of collective engines dynamically configured by a hierarchy-setup software process into a plurality of subsets that change over time, wherein the plurality of collective engines are interconnected to one another on a network, and wherein when each subset of the plurality of subsets of collective engines is formed, that subset is configured by the software process into a hierarchy of collective engines, wherein each hierarchy includes:
     a collective engine configured as a root collective engine, and
     a first plurality of collective engines configured as leaf collective engines that are each connected to an intermediate level of collective engines, configured as parent collective engines, wherein the intermediate level of collective engines is between the root collective engine and the first plurality of leaf collective engines, wherein each collective engine in the hierarchy except the root collective engine is configured by the hierarchy-setup software process to have a parent collective engine, and wherein each non-leaf collective engine in the hierarchy is configured by the hierarchy-setup software process to have a set of child collective engines;
   a message-passing facility that passes collective-operations messages over the network between collective engines; and
   a software-accessible interface that receives a specification of a reduction operation and input operand data into each of the first plurality of leaf collective engines from leaf software processes, and a specification for each collective engine to send result operand data and the specification of the reduction operation from the leaf collective engines toward a root software process connected to the root collective engine, wherein each collective engine in its hierarchy receives a plurality of messages, each message containing input-operand data and the specification of the reduction operation to be performed, repeatedly performs the specified reduction operation to produce result data, and outputs the result data to its parent collective engine, and wherein the root collective engine conveys final result data to the root software process, wherein error checking is performed on the specification of the reduction operation that is specified with operand data.

12. The data processing system of claim 11, wherein the collective operations includes a multicast one to all collective operation.

13. The data processing system of claim 11, wherein the collective operations includes a barrier collective operation.

14. The data processing system of claim 11, wherein the collective operation specifies a vector reduction operation that is performed on a plurality of vector operands, each vector operand including a plurality of vector elements, and where the set of results received into the parent network node of the first one of the plurality of collective engines includes a vector result for each of the plurality of vector operands that are each passed between network, and wherein the specified vector reduction operation is performed on each respective vector element.

15. A data-processing system for performing collective operations, the system comprising:
 a root processor node;
 a plurality of leaf processor nodes;
 a network that passes messages containing configuration information and messages that contain operand data and specifications of collective operations to be performed; and
 a plurality of collective engines, logically configured in a hierarchical structure, wherein the hierarchical structure includes a first level of collective engines and a second level of collective engines, wherein the collective engines of the first layer are logically connected to leaf processor nodes, and wherein the collective engines of the second layer are logically connected to the root processor node, wherein the plurality of collective engines receive the messages that contain the operand data and the specifications of collective operations to be performed, check that the specifications of collective operations to be performed are equal to one another and signal error if not, and perform the specified collective operation on the received operand data and pass reduction results to a parent collective engine of plurality of collective engines, and wherein a final result is produced by the root processor node.

16. The data processing system of claim 15, wherein the root processor node and the leaf processor nodes are operable to simultaneously participate in each of a plurality of hierarchical structures.

17. The data processing system of claim 15, wherein the final result is transmitted back to all nodes in the hierarchical structure.

18. The data processing system of claim 15, wherein the result of the collective reduction operation is checked for errors.

19. The data processing system of claim 15, wherein the collective operation specifies a vector reduction operation that is performed on a plurality of vector operands, each vector operand including a plurality of vector elements, and where the set of results received into the parent network node of the first one of the plurality of collective engines includes a vector result for each of the plurality of vector operands that are each passed between network, and wherein the specified vector reduction operation is performed on each respective vector element.

20. The data processing system of claim 15, wherein each collective engine has functionality to perform a reduction operation on a plurality of independent data elements simultaneously.

21. A data-processing method for performing a collective operation, the method comprising:
 providing a plurality of network nodes, a first plurality of processors, and a first plurality of collective engines, wherein each one of the plurality of network nodes is coupled to one of the first plurality of processors, wherein each one of the plurality of network nodes includes one of the first plurality of collective engines, and wherein each of the first plurality of collective engines is configurable to specify a parent network node of that respective collective engine; a network that interconnects the plurality of network nodes; and a memory operatively coupled to the first plurality of processors;
 determining, in the parent network node of a first one of the plurality of collective engines, a first subset of other network nodes of the system that are to be used to execute a collective reduction operation;
 logically arranging the subset of other network nodes into a hierarchical structure;
 transmitting a specification of the collective reduction operation to the subset of other network nodes based on the hierarchical structure via at the network;
 receiving, into the parent network node of the first one of the plurality of collective engines, a set of results from the execution of the collective reduction operations from the subset of the other processor nodes;
 performing the collective reduction operation on the received set of results to generate a final collective reduction result; and
 passing the final collective reduction result to the software process,
 wherein the specification of the collective reduction operation includes a specification of a vector reduction operation that is performed on a plurality of vector operands, each vector operand including a plurality of vector elements, and where the set of results received into the parent network node of the first one of the plurality of collective engines includes a vector result for each of the plurality of vector operands that are each passed between network, and wherein the specified vector reduction operation is performed on each respective vector element.

22. The method of claim 21, further comprising checking the specifications of reduction operations received with the operand data from its child collective engines, and signaling an error if not all the specifications are equal.

23. The method of claim 21, further comprising:
 performing a reduction operation in each collective engine simultaneously on a plurality of independent data elements.

24. The method of claim 21, wherein the collective reduction operation includes an integer signed two's complement minimum operation that returns a lowest index if there are multiple lowest comparands.

25. The method of claim 21, wherein the collective reduction operation includes a floating point minimum operation that returns a lowest index if there are multiple lowest comparands.

26. The method of claim 21, wherein the collective reduction operation includes an integer signed two's complement maximum operation that returns a greatest index if there are multiple greatest comparands.

27. The method of claim 21, wherein the collective reduction operation includes a floating point maximum operation that returns a greatest index if there are multiple greatest comparands.

* * * * *